(12) United States Patent
Kitazato

(10) Patent No.: US 8,908,103 B2
(45) Date of Patent: Dec. 9, 2014

(54) CONTENT SUPPLYING APPARATUS, CONTENT SUPPLYING METHOD, CONTENT REPRODUCTION APPARATUS, CONTENT REPRODUCTION METHOD, PROGRAM AND CONTENT VIEWING SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 13/238,138

(22) Filed: Sep. 21, 2011

(65) Prior Publication Data

US 2012/0084829 A1     Apr. 5, 2012

Related U.S. Application Data

(60) Provisional application No. 61/504,593, filed on Jul. 5, 2011, provisional application No. 61/388,999, filed on Oct. 1, 2010.

(51) Int. Cl.
| | |
|---|---|
| H04N 5/38 | (2006.01) |
| H04N 21/81 | (2011.01) |
| H04N 21/654 | (2011.01) |
| H04H 20/24 | (2008.01) |
| H04N 21/6332 | (2011.01) |
| H04H 20/38 | (2008.01) |

(52) U.S. Cl.
CPC ............. *H04N 21/812* (2013.01); *H04H 20/38* (2013.01); *H04N 21/654* (2013.01); *H04H 20/24* (2013.01); *H04N 21/6332* (2013.01)
USPC ..................................... 348/723; 348/E7.069

(58) Field of Classification Search
USPC ......................................................... 348/723
See application file for complete search history.

(56) References Cited

U.S. PATENT DOCUMENTS

| | | | |
|---|---|---|---|
| 5,861,881 A * | 1/1999 | Freeman et al. | 715/201 |
| 7,584,491 B2 * | 9/2009 | Bruckner et al. | 725/36 |
| 2003/0033157 A1 | 2/2003 | Dempski et al. | |
| 2003/0037068 A1 | 2/2003 | Thomas et al. | |
| 2003/0086003 A1 | 5/2003 | Koga | |

(Continued)

FOREIGN PATENT DOCUMENTS

| | | |
|---|---|---|
| JP | 2003-9113 | 1/2003 |
| JP | 2003-18583 | 1/2003 |

(Continued)

OTHER PUBLICATIONS

International Search Report issued Jul. 17, 2012, in International Application No. PCT/JP2012/064806 (with English translation).

(Continued)

*Primary Examiner* — Jefferey Harold
*Assistant Examiner* — Justin Sanders
(74) *Attorney, Agent, or Firm* — Oblon, Spivak, McClelland, Maier & Neustadt, L.L.P.

(57) ABSTRACT

Disclosed herein is a content supplying apparatus for supplying a video content to a content reproduction apparatus, including: a production section adapted to produce a video switch command for causing the content reproduction apparatus to execute a process regarding changeover of a video content to be reproduced; a broadcasting section adapted to broadcast a video content, in which the produced video switch command is embedded, through a broadcasting network; and a delivery section adapted to deliver the video content through the Internet.

16 Claims, 32 Drawing Sheets

Switch Command

| ITEM | DESCRIPTION |
|---|---|
| command_id | ID FOR IDENTIFYING VIDEO SWITCH COMMAND |
| Switch_id | ID FOR IDENTIFYING STREAM CHANGEOVER |
| Command code | CODE NUMBER WHICH INDICATES Switch |
| Target Media Type | CHANGEOVER DESTINATION STREAM TYPE 0:broadcast 1:VOD/MP4 2:VOD/MPEG2_TS 3:VOD/AVC_TS |
| Target Stream URL | CHANGEOVER DESTINATION STREAM ACQUISITION DESTINATION URL (ALSO BROADCASTING, ACCUMULATION) |
| Stream_Start_Position | REPRODUCTION START TIME POSITION OF CHANGEOVER DESTINATION STREAM (SECOND) |
| Loop Back Mode | 0:Non Loop-Back-Mode    1:Loop-Back-Mode |
| Personalized Mode | 0:Not Personalized(fixed stream)    1:DeviceID based  2:Password based |
| Auto Switch flag | 0:manual switch    1:Auto switch |
| Switching message | QUESTION OF STREAM SELECTION IN CASE OF MANUAL SWITCHING |

(56) References Cited

U.S. PATENT DOCUMENTS

| | | | |
|---|---|---|---|
| 2004/0031058 A1* | 2/2004 | Reisman | 725/112 |
| 2006/0194535 A1 | 8/2006 | Houldsworth et al. | |
| 2006/0242692 A1* | 10/2006 | Thione et al. | 726/9 |
| 2007/0169164 A1 | 7/2007 | Marilly et al. | |
| 2008/0028074 A1 | 1/2008 | Ludvig | |
| 2008/0120638 A1 | 5/2008 | King et al. | |
| 2008/0247543 A1* | 10/2008 | Mick et al. | 380/201 |
| 2009/0087161 A1 | 4/2009 | Roberts et al. | |
| 2009/0125946 A1 | 5/2009 | Fukuda | |
| 2009/0313663 A1 | 12/2009 | Kitazato et al. | |
| 2009/0320064 A1 | 12/2009 | Soldan et al. | |
| 2010/0205628 A1 | 8/2010 | Davis et al. | |

FOREIGN PATENT DOCUMENTS

| | | |
|---|---|---|
| JP | 2003-530033 | 10/2003 |
| JP | 2006-50237 | 2/2006 |
| JP | 2007-116669 | 5/2007 |
| JP | 2008-53916 | 3/2008 |
| JP | 2009-118343 | 5/2009 |
| JP | 2010-288192 | 12/2010 |
| WO | WO 2010/109860 A1 | 9/2010 |

OTHER PUBLICATIONS

Kentaro Yamazaki, "Open House 2011. Linking the TV and the SNS [Hybridcast]", [online], May 24, 2011, [Search day Aug. 21, 2012], <URL:http://av.watch.impress.co.jp/doc/news/20110524_448049.html>, 6 pages.

U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/554,688, filed Jul. 20, 2012, Kitazato, et al.
U.S. Appl. No. 13/238,080, filed Sep. 21, 2011, Kitazato, et al.
U.S. Appl. No. 13/239,871, filed Sep. 22, 2011, Kitazato.
U.S. Appl. No. 13/238,264, filed Sep. 21, 2011, Kitazato.
U.S. Appl. No. 13/238,277, filed Sep. 21, 2011, Kitazato.
U.S. Appl. No. 13/238,065, filed Sep. 21, 2011, Kitazato.
U.S. Appl. No. 13/220,231, filed Aug. 29, 2011, Kitahara, et al.
U.S. Appl. No. 13/071,559, filed Mar. 25, 2011, Yamagishi, et al.
U.S. Appl. No. 13/081,566, filed Apr. 7, 2011, Kitazato, et al.
U.S. Appl. No. 12/980,917, filed Dec. 29, 2010, Dewa.
U.S. Appl. No. 13/080,866, filed Apr. 6, 2011, Kitazato, et al.
U.S. Appl. No. 13/071,551, filed Mar. 25, 2011, Kitazato, et al.
U.S. Appl. No. 13/071,560, filed Mar. 25, 2011, Yamagishi.
U.S. Appl. No. 13/071,238, filed Mar. 24, 2011, Yamagishi.
U.S. Appl. No. 13/075,440, filed Mar. 30, 2011, Yamagishi, et al.
U.S. Appl. No. 13/107,604, filed May 13, 2011, Dewa.
International Search Report issued Dec. 20, 2011 in Application No. PCT/JP2011/071567 (With English Translation).
International Search Report issued Dec. 20, 2011 in Application No. PCT/JP2011/071568 (With English Translation).
International Search Report issued Dec. 27, 2011 in Application No. PCT/JP2011/071569 (With English Translation).
International Search Report issued Dec. 27, 2011 in Application No. PCT/JP2011/071570 (With English Translation).
Hideaki Kimata, "Movement on MPEG 3DAV toward International Standardization of 3D Video", IPSJ SIG Notes, vol. 2005—AVM—48, 2005, No. 23, 10 pages (With English Abstract).
International Search Report issued Nov. 29, 2011, in PCT/JP2011/071566 (with English-language translation).
Extended European Search Report issued Feb. 6, 2014 in Patent Application No. 11828915.6.
Office Action issued Feb. 20, 2014 in Japanese Patent Application No. 2013-520530 with English language translation.
Extended European Search Report issued Feb. 26, 2014 in Patent Application No. 11828910.7.
Extended European Search Report issued Mar. 6, 2014 in Patent Application No. 11828911.5.
Extended European Search Report issued May 12, 2014, in European Patent Application No. 11828914.9.
Extended European Search Report issued May 8, 2014, in European Patent Application No. 11828912.3.
Extended European Search Report issued Oct. 1, 2014, in European Patent Application No. 12800685.5.

* cited by examiner

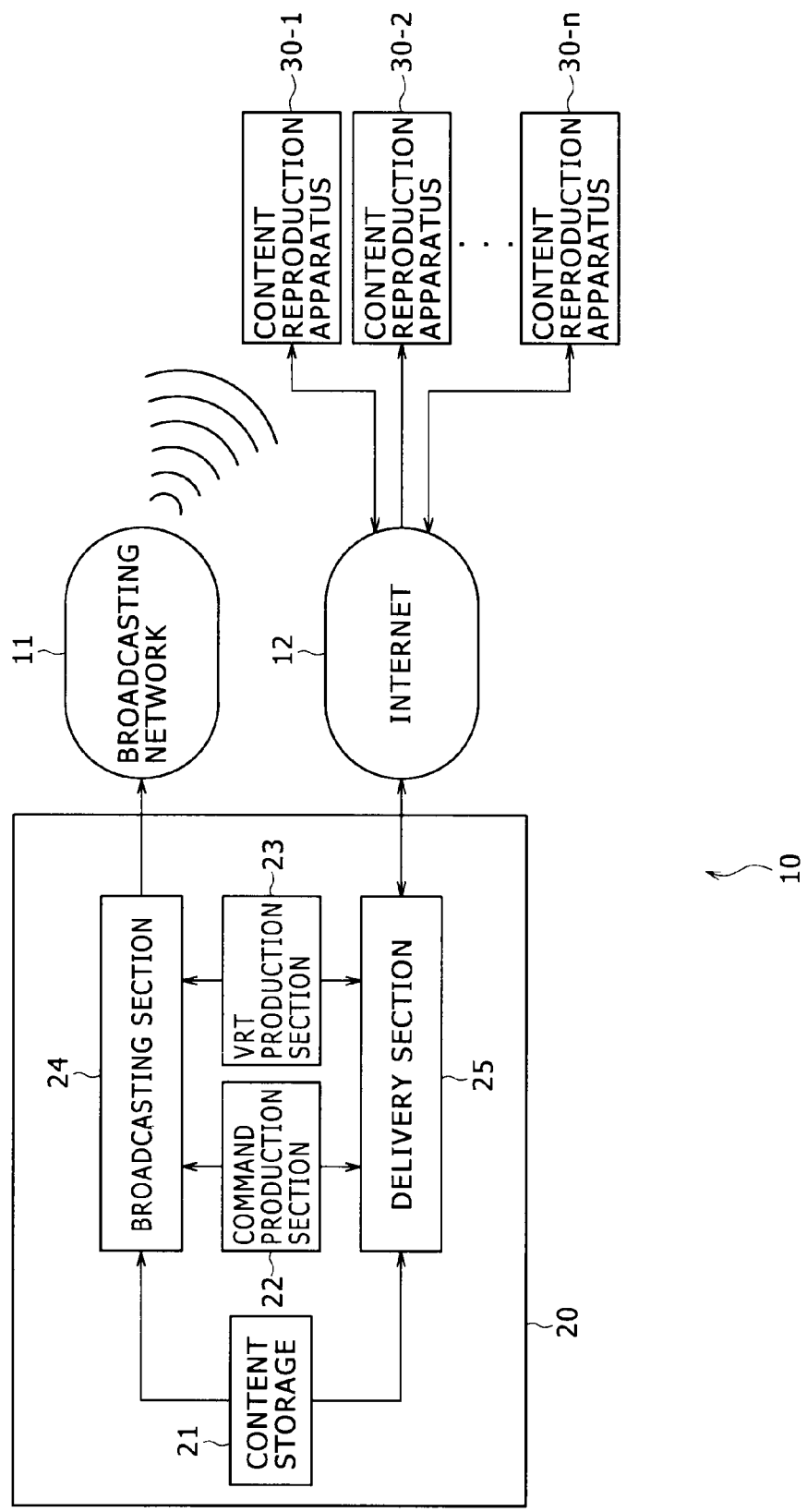

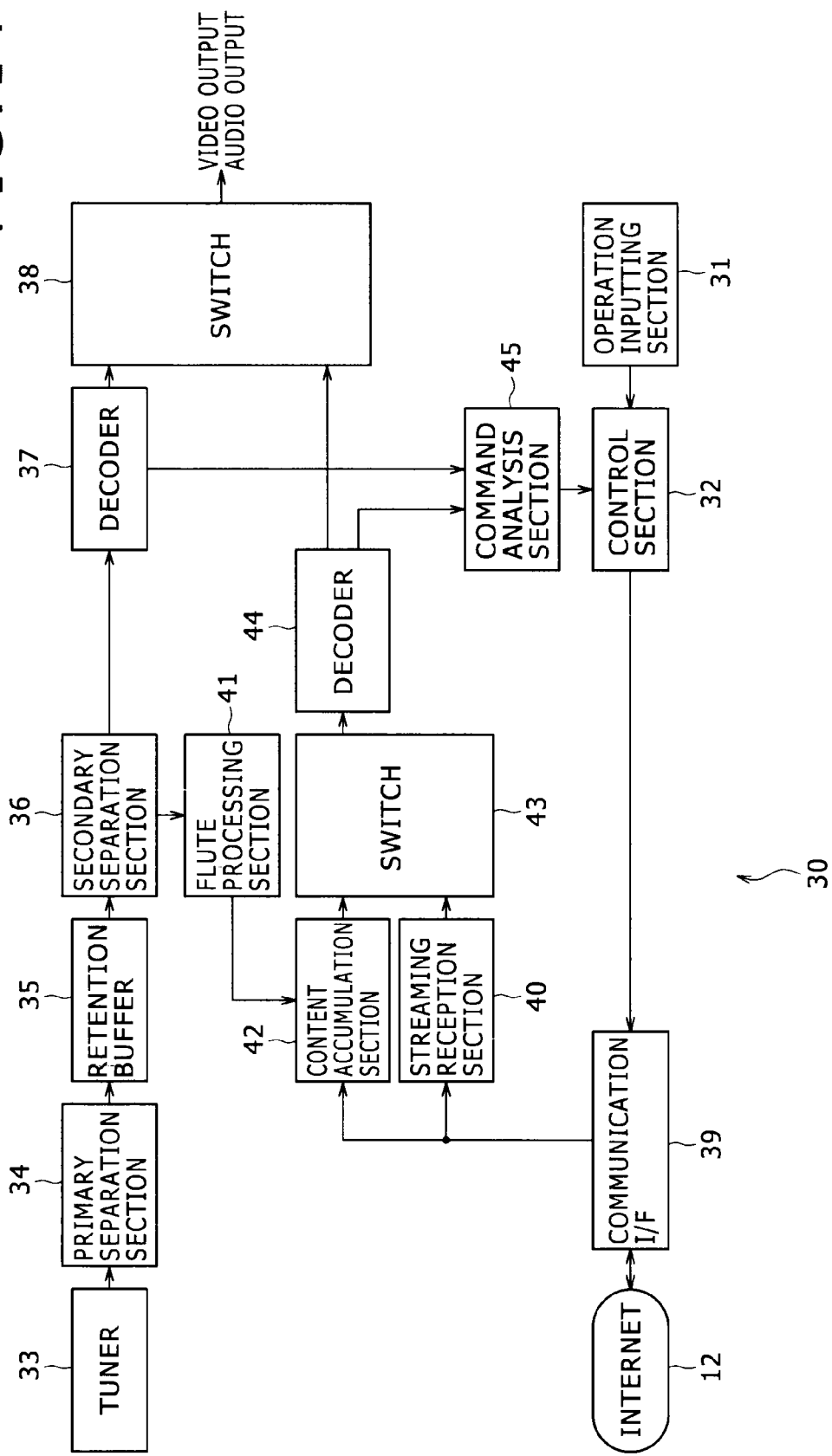

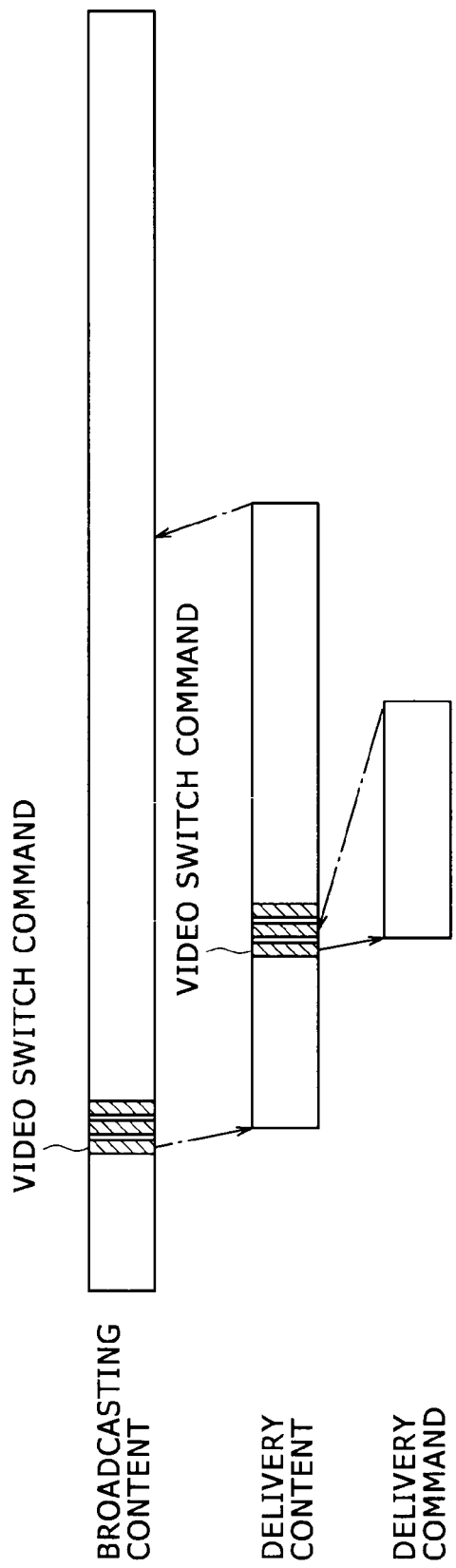

FIG. 16

Switch Command

| ITEM | DESCRIPTION |
|---|---|
| command_id | ID FOR IDENTIFYING VIDEO SWITCH COMMAND |
| Switch_id | ID FOR IDENTIFYING STREAM CHANGEOVER |
| Command code | CODE NUMBER WHICH INDICATES Switch |
| Target Media Type | CHANGEOVER DESTINATION STREAM TYPE 0:broadcast 1:VOD/MP4 2:VOD/MPEG2_TS 3:VOD/AVC_TS |
| Target Stream URL | CHANGEOVER DESTINATION STREAM ACQUISITION DESTINATION URL (ALSO BROADCASTING, ACCUMULATION) |
| Stream_Start_Position | REPRODUCTION START TIME POSITION OF CHANGEOVER DESTINATION STREAM (SECOND) |
| Loop Back Mode | 0:Non Loop-Back-Mode   1:Loop-Back-Mode |
| Personalized Mode | 0:Not Personalized(fixed stream)   1:DeviceID based 2:Password based |
| Auto Switch flag | 0:manual switch   1:Auto switch |
| Switching message | QUESTION OF STREAM SELECTION IN CASE OF MANUAL SWITCHING |

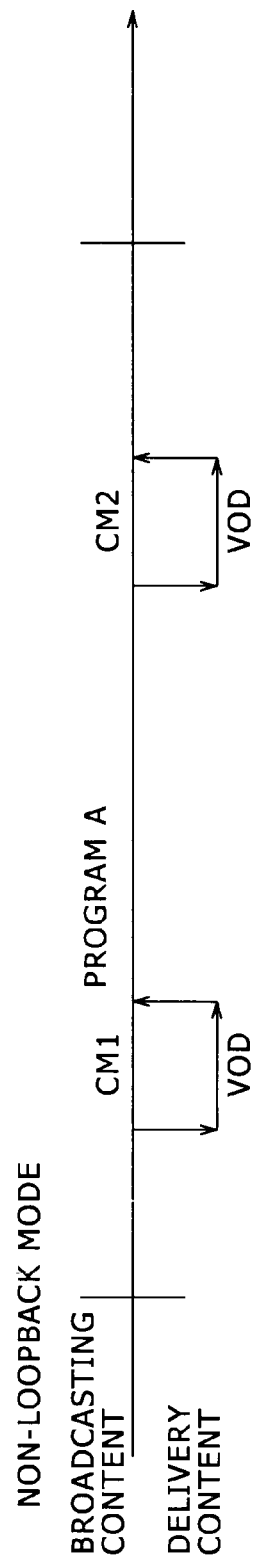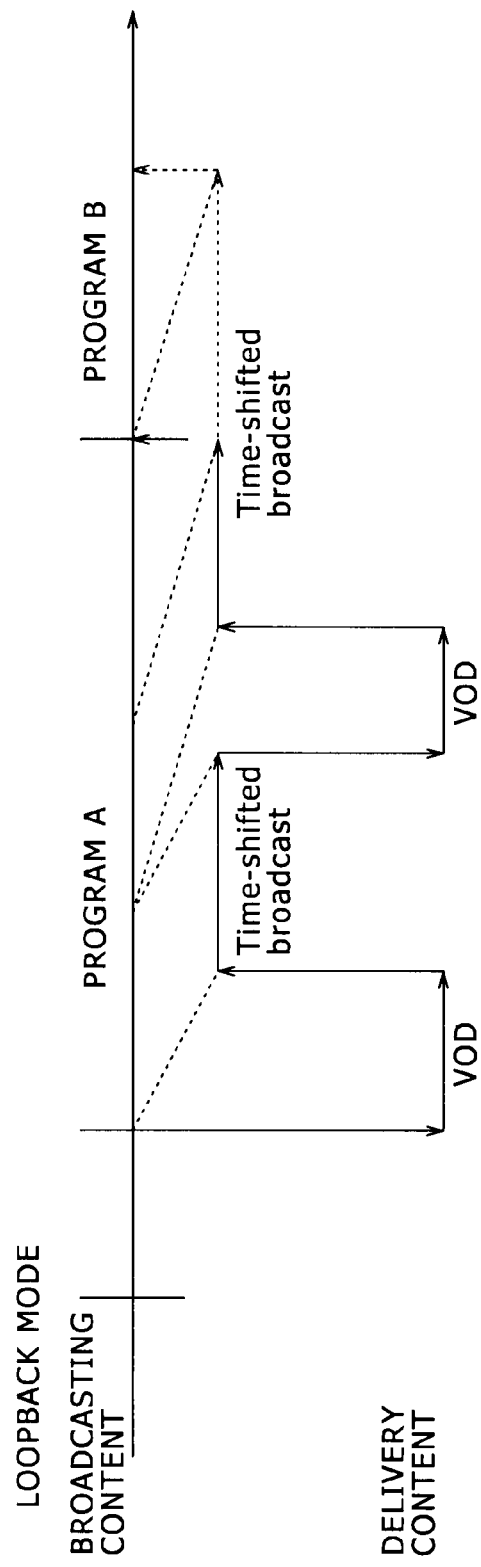

FIG. 18

Pre-load Command

| ITEM | DESCRIPTION |
|---|---|
| command_id | ID FOR IDENTIFYING VIDEO SWITCH COMMAND |
| Switch_id | ID FOR IDENTIFYING STREAM CHANGEOVER |
| Command code | CODE NUMBER WHICH INDICATES Pre-load |
| Target Media Type | CHANGEOVER DESTINATION STREAM TYPE 0:broadcast 1:VOD/MP4 2:VOD/MPEG2_TS 3:VOD/AVC_TS |
| Target Stream URL | CHANGEOVER DESTINATION STREAM ACQUISITION DESTINATION URL (ALSO BROADCASTING, ACCUMULATION) |
| Stream_Start_Position | REPRODUCTION START TIME POSITION OF CHANGEOVER DESTINATION STREAM (SECOND) |
| Loop Back Mode | 0:Non Loop-Back mode   1:Loop-Back mode |
| Personalized Mode | 0:Not Personalized(fixed stream)   1:DeviceID based 2:Password based |
| Time_to_Switch | SCHEDULED TIME TILL STREAM CHANGEOVER (SECOND) |

FIG.19

Pre-select Command

| ITEM | DESCRIPTION |
|---|---|
| command_id | ID FOR IDENTIFYING VIDEO SWITCH COMMAND |
| Switch_id | ID FOR IDENTIFYING STREAM CHANGEOVER |
| Command code | CODE NUMBER WHICH INDICATES Pre-select |
| Switching message | QUESTION OF STREAM SELECTION |
| Time_to_Switch | SCHEDULED TIME TILL STREAM CHANGEOVER (SECOND) |

FIG. 20

Enable-switch command

| ITEM | DESCRIPTION |
|---|---|
| command_id | ID FOR IDENTIFYING VIDEO SWITCH COMMAND |
| Switch_id | ID FOR IDENTIFYING STREAM CHANGEOVER |
| Command code | CODE NUMBER WHICH INDICATES Enable-Switch |
| Switching Meta URL | ACQUISITION DESTINATION OF VRT |

FIG. 21
VRT

| ELEMENT(ATTRIBUTE) | APPEARANCE NUMBER | VALUE | DEFINITION AND DETAILED WORKING |
|---|---|---|---|
| View_object | 1..N | | VIEWPOINT OBJECT |
| @id | 1..N | INTEGRAL VALUE EQUAL TO OR MORE THAN 0 | OBJECT ID |
| @name | 0..1 | TEXT | VIEWPOINT NAME |
| @format | 0..1 | 0:BROADCASTING 1:VOD 2:PICTURE FRAME DESIGNATION VOD 3:Multi-cast | SIGNAL FORMAT |
| @horizontal_size | 0..1 | INTEGRAL VALUE EQUAL TO OR MORE THAN 0 | VIDEO IMAGE HORIZONTAL DIRECTION SIZE |
| @vertical_size | 0..1 | INTEGRAL VALUE EQUAL TO OR MORE THAN 0 | VIDEO IMAGE VERTICAL DIRECTION SIZE |
| @location | 1 | TEXT | VIEWPOINT STREAM ACQUISITION DESTINATION URL |
| neighbor_view | 0..1 | | ADJACENT VIEWPOINT OBJECT |
| @id | 1 | INTEGRAL VALUE EQUAL TO OR MORE THAN 0 | OBJECT ID |
| @type | 1 | "panorama" "theater" | VIEWPOINT COLUMN TYPE |
| @direction | 1 | "up" "down" "left" "right" "forward" "backward" | ADJACENT VIEWPOINT DIRECTION |
| @distance | 0..1 | NUMERICAL VALUE | IN "panorama," "theater," ADJACENT VIEW FIELD ANGLE IS INDICATED IN DEGREE |

FIG.22

Disable-switch command

| ITEM | DESCRIPTION |
|---|---|
| command_id | ID FOR IDENTIFYING VIDEO SWITCH COMMAND |
| Switch_id | ID FOR IDENTIFYING STREAM CHANGEOVER |
| Command code | CODE NUMBER WHICH INDICATES Enable-Switch |

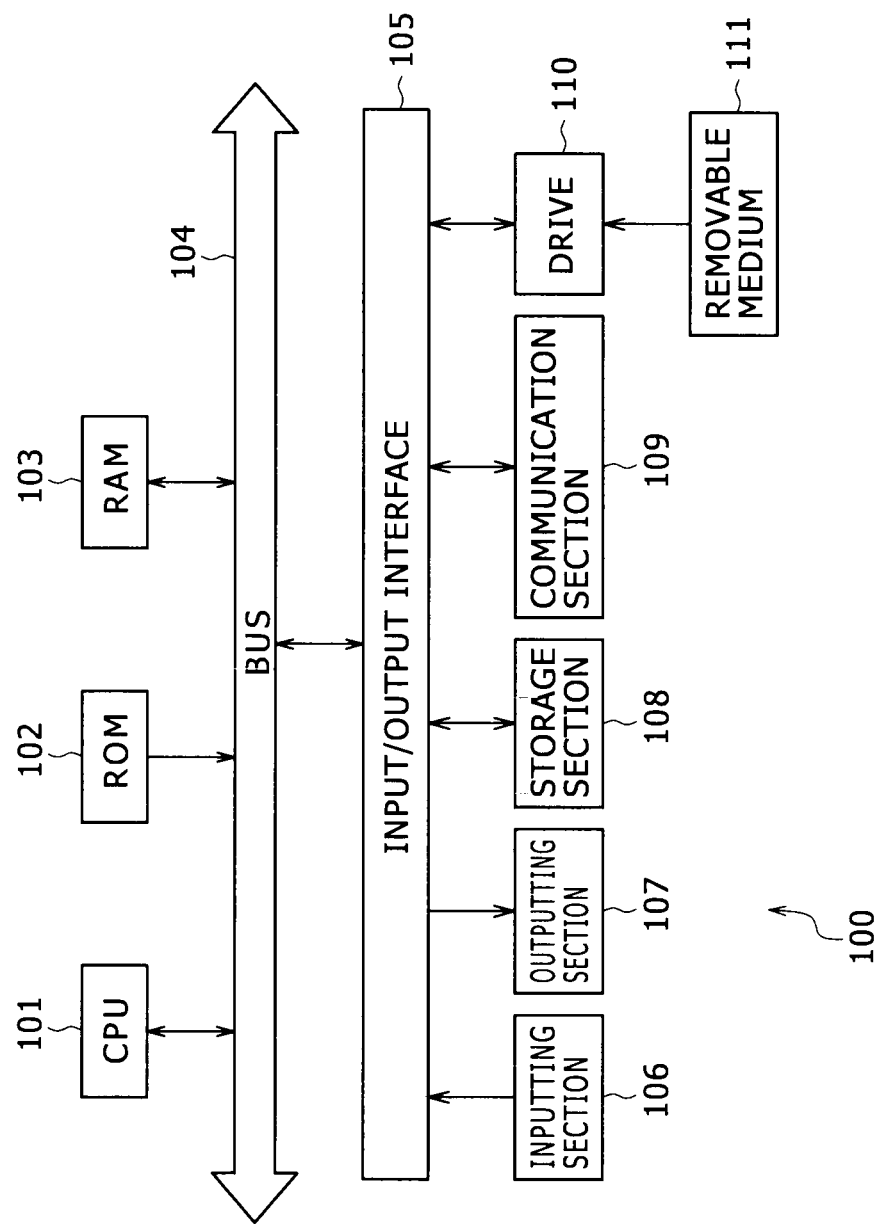

CONTENT SUPPLYING APPARATUS, CONTENT SUPPLYING METHOD, CONTENT REPRODUCTION APPARATUS, CONTENT REPRODUCTION METHOD, PROGRAM AND CONTENT VIEWING SYSTEM

CROSS-REFERENCE TO RELATED APPLICATION

This application claims the benefit of priority of Provisional Application Ser. Nos. 61/388,999, filed Oct. 1, 2010 and 61/504,593, filed Jul. 5, 2011, the entire contents of which is incorporated herein by reference.

BACKGROUND

The present disclosure relates to a content supplying apparatus, a content supplying method, a content reproduction apparatus, a content reproduction method, a program and a content viewing system, and particularly to a content supplying apparatus, a content supplying method, a content reproduction apparatus, a content reproduction method, a program and a content viewing system which make it possible to reproduce a broadcasting content by digital television broadcasting and a delivery content delivered through the Internet in an associated relationship with each other.

Digitization of television broadcasting is promoted and digital television broadcasting in which a ground wave, a satellite wave or the like is used is popularized. In the digital television broadcasting, not only a video content as a so-called program but also data broadcasting have been implemented. With the data broadcasting, it is possible to display information, for example, relating to a program during broadcasting or display information (notification of a different program, a news, a weather forecast, traffic information or the like) which does not relate to a program during broadcasting (for example, refer to Japanese Patent Laid-Open No. 2006-50237).

On the other hand, some of reception apparatus for digital television broadcasting represented by a digital television receiver have a VOD (Video On Demand) function capable of acquiring a video content to be enjoyed at an arbitrary timing through the Internet and reproducing the acquired content.

SUMMARY

As described above, an existing digital television receiver having the VOD function can receive and reproduce each of a video content (hereinafter referred to as broadcasting content) by digital television broadcasting and another video content (hereinafter referred to as delivery content) delivered through the Internet.

However, for example, such rapid successive reproduction of a broadcasting content and a delivery content that video images of a broadcasting content and a delivery content which are associated with each other are changed over with each other and displayed has not been implemented.

The present disclosure has been made in view of such a situation as described above and implements rapid successive reproduction of a broadcasting content and a delivery content which are associated with each other.

A content supplying apparatus according to a first mode of the present disclosure is a content supplying apparatus for supplying a video content to a content reproduction apparatus, including a production section adapted to produce a video switch command for causing the content reproduction apparatus to execute a process regarding changeover of a video content to be reproduced, a broadcasting section adapted to broadcast a video content, in which the produced video switch command is embedded, through a broadcasting network, and a delivery section adapted to deliver the video content through the Internet.

The production section may produce the video switch command as a preselect command for urging the user to confirm whether or not execution of changeover of the video content to be reproduced is permitted preceding to a changeover timing of the video content to be reproduced, a preload command for causing a video content of the changeover destination to be acquired preceding to the changeover timing of the video content to be reproduced, or a switch command for causing the video content, which is to be reproduced, to be changed over.

The production section may produce the video switch command including an element for the instruction regarding whether or not loopback is to be carried out upon returning, after the video content to be reproduced is changed over, to the video stream before the changeover.

The production section may produce the video switch command including an element for the instruction regarding whether or not user authentication is to be carried out upon acquisition of the video content of the changeover destination.

The production section may produce the video switch command as the preselect command, the preload command, the switch command, an enable switch command for establishing a state in which the video content can be changed over to a video content corresponding to a point of view designated by the user, or a disable switch command for ending the state in which the video content can be changed over to a video content corresponding to a point of view designated by the user.

Also the delivery section may deliver the video content, in which the produced video switch command is embedded, through the Internet.

A content supplying method according to the first mode of the present disclosure is a content supplying method for a content supplying apparatus which supplies a video content to a content reproduction apparatus, the content supplying method including a production step of producing a video switch command for causing the content reproduction apparatus to execute a process regarding changeover of a video content to be reproduced, a broadcasting step of broadcasting a video content, in which the produced video switch command is embedded, through a broadcasting network, and a delivery step of delivering the video content through the Internet, carried out by the content supplying apparatus.

A program according to the first mode of the present disclosure is a program for causing a computer, which supplies a video content to a content reproduction apparatus, to function as a production section adapted to produce a video switch command for causing the content reproduction apparatus to execute a process regarding changeover of a video content to be reproduced, a broadcasting section adapted to broadcast a video content, in which the produced video switch command is embedded, through a broadcasting network, and a delivery section adapted to deliver the video content through the Internet.

In the first mode of the present disclosure, a video switch command for causing a content reproduction apparatus to execute a process regarding changeover of a video content to be reproduced is produced, and a video content in which the produced video switch command is embedded is broadcasted through the broadcasting network. Further, the video content is delivered through the Internet.

A content reproduction apparatus according to a second mode of the present disclosure is a content reproduction apparatus for reproducing a video content supplied from a content supplying apparatus, including an acquisition section adapted to acquire a video content broadcasted through a broadcasting network or a video content delivered through the Internet, an analysis section adapted to analyze a video switch command embedded in the acquired video content, and a control section adapted to control a process regarding changeover of a video content to be reproduced in accordance with a result of the analysis of the video switch command.

The video switch command may be a preselect command for urging the user to confirm whether or not execution of changeover of the video content to be reproduced is permitted preceding to a changeover timing of the video content to be reproduced, a preload command for causing a video content of the changeover destination to be acquired preceding to the changeover timing of the video content to be reproduced, or a switch command for causing the video content, which is to be reproduced, to be changed over.

The content reproduction apparatus according to the second mode of the present disclosure may further include a buffer section adapted to buffer the video content broadcasted through the broadcasting network, and wherein the video switch command includes an element for the instruction regarding whether or not loopback is to be carried out upon returning, after the video content to be reproduced is changed over, to the video stream before the changeover.

A content reproduction method according to the second mode of the present disclosure is a content reproduction method for a content reproduction apparatus, which reproduces a video content supplied from a content supplying apparatus, the content reproduction method including an acquisition step of acquiring a video content broadcasted through a broadcasting network or a video content delivered through the Internet, an analysis step of analyzing a video switch command embedded in the acquired video content, and a control step of controlling a process regarding changeover of a video content to be reproduced in accordance with a result of the analysis of the video switch command, carried out by the content reproduction apparatus.

A program according to the second mode of the present disclosure is a program for causing a computer, which reproduces a video content supplied from a content supplying apparatus, to function as an acquisition section adapted to acquire a video content broadcasted through a broadcasting network or a video content delivered through the Internet, an analysis section adapted to analyze a video switch command embedded in the acquired video content, and a control section adapted to control a process regarding changeover of a video content to be reproduced in accordance with a result of the analysis of the video switch command.

In the second mode of the present disclosure, a video content broadcasted through a broadcasting network or a video content delivered through the Internet is acquired, and a video switch command embedded in the acquired video content is analyzed. Then, a process regarding changeover of the video content to be reproduced is controlled in accordance with a result of the analysis of the video switch command.

A content viewing system according to a third mode of the present disclosure is a content viewing system which includes a content supplying apparatus and a content reproduction apparatus, wherein the content supplying apparatus includes a production section adapted to produce a video switch command for causing the content reproduction apparatus to execute a process regarding changeover of a video content to be reproduced, a broadcasting section adapted to broadcast a video content, in which the produced video switch command is embedded, through a broadcasting network, and a delivery section adapted to deliver the video content through the Internet. The content reproduction apparatus includes an acquisition section adapted to acquire a video content broadcasted through the broadcasting network or a video content delivered through the Internet, an analysis section adapted to analyze a video switch command embedded in the acquired video content, and a control section adapted to control a process regarding changeover of a video content to be reproduced in accordance with a result of the analysis of the video switch command.

In the third mode of the present disclosure, by the content supplying apparatus, a video switch command for causing a content reproduction apparatus to execute a process regarding changeover of a video content to be reproduced is produced, and a video content in which the produced video switch command is embedded is broadcasted through the broadcasting network. Further, the video content is delivered through the Internet. On the other hand, by the content reproduction apparatus, the video content broadcasted through the broadcasting network or the video content delivered through the Internet is acquired, and a video switch command embedded in the acquired video content is analyzed. Then, a process regarding changeover of the video content to be reproduced is controlled in accordance with a result of the analysis of the video switch command.

With the first mode of the present disclosure, a broadcasting content and a delivery content which can be successively reproduced can be supplied to the reception side.

With the second mode of the present disclosure, a broadcasting content and a delivery content which are associated with each other can be successively reproduced.

With the third mode of the present disclosure, rapid successive reproduction of a broadcasting content and a delivery content which are associated with each other can be implemented.

BRIEF DESCRIPTION OF THE DRAWINGS

FIG. 13 is a block diagram showing an example of a configuration of a content viewing system to which the present disclosure is applied;

FIG. 14 is a block diagram showing an example of a configuration of a content reproduction apparatus;

FIG. 15 is a view illustrating a transmission timing of a video switch command;

FIG. 16 is a view showing elements of a switch command;

FIG. 17 is a view illustrating a loopback mode;

FIG. 18 is a view illustrating elements of a preload command;

FIG. 19 is a view illustrating elements of a preselect command;

FIG. 20 is a view illustrating elements of an enable switch command;

FIG. 21 is a view illustrating elements of a VRT;

FIG. 22 is a view illustrating elements of a disable switch command;

FIG. 33 is a block diagram showing an example of a configuration of a computer.

DETAILED DESCRIPTION OF THE PREFERRED EMBODIMENT

In the following, the best mode (hereinafter referred to as embodiment) for carrying out the present disclosure is described in detail with reference to the drawings.

First, a broadcasting content and a delivery content which are associated with each other and a successive reproduction scenario to be implemented by a content viewing system which is an embodiment of the present disclosure is described. It is to be noted that, as a delivery content supplied to the reception side through the Internet, two kinds of contents including a streaming content delivered by streaming delivery and an accumulated content produced by the reception side accumulating contents delivered preceding to a reproduction timing of the content are assumed. It is to be noted that also it is possible to cause a video content as the accumulated content to be downloaded through a broadcasting network preceding to the reproduction timing.

Figure 1:
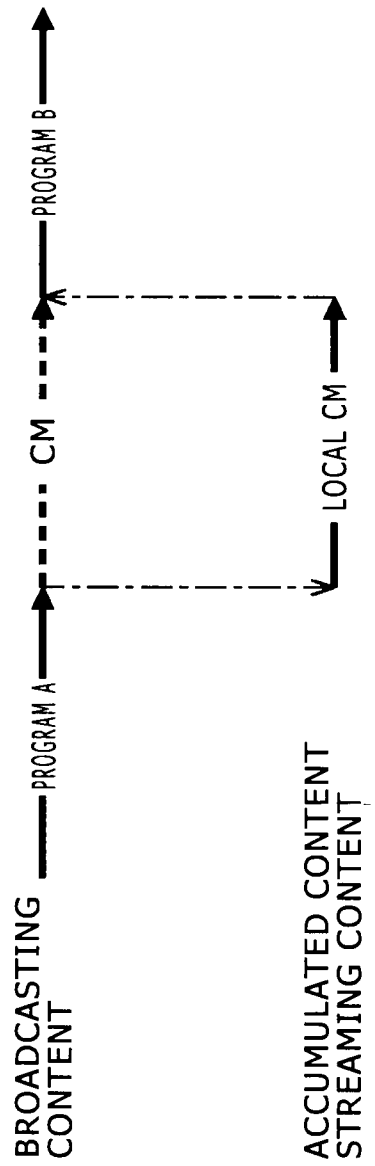
FIG. 1 is a view illustrating a first successive reproduction scenario (replacement of a broadcast CM)

FIG. 1 is a view illustrating a first successive reproduction scenario (replacement of a broadcast CM). In this scenario, if a commercial message (CM) is started when the viewer enjoys a program A as a broadcasting content, then a specialized CM specialized for the viewer by an accumulated content or a streaming content is reproduced in place of the broadcast CM. As the specialized CM, for example, a local CM adapted to an address of the viewer, a CM adapted to a liking and so forth are assumed. Profile information such as an address, a liking and so forth of the viewer is registered in a reception apparatus in advance, and replacement of the broadcast CM with the specialized CM is carried out only in the reception apparatus in which the profile information is registered already.

Figure 2:
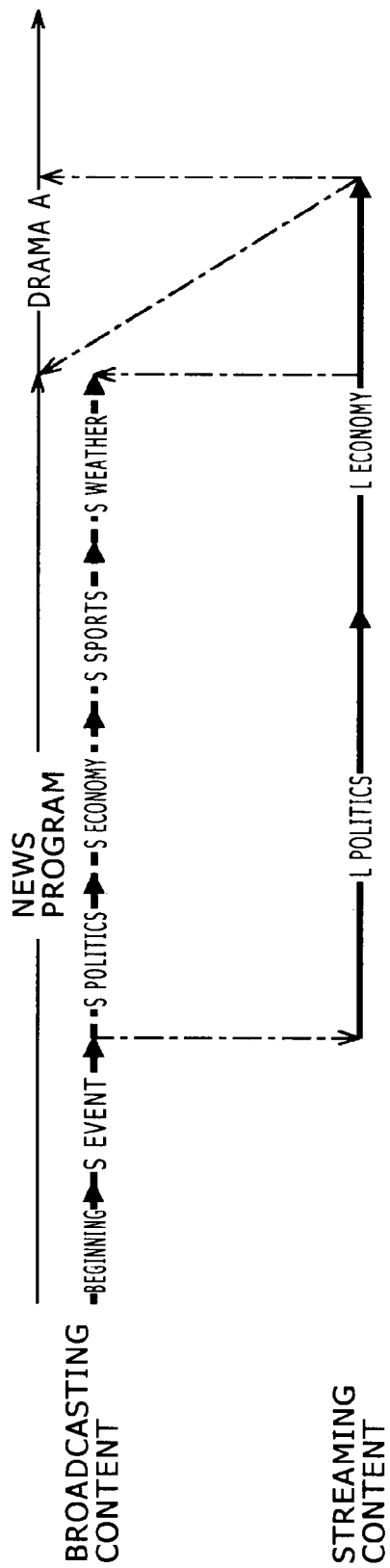
FIG. 2 is a view illustrating a second successive reproduction scenario (variable time length program)
Figure 3:
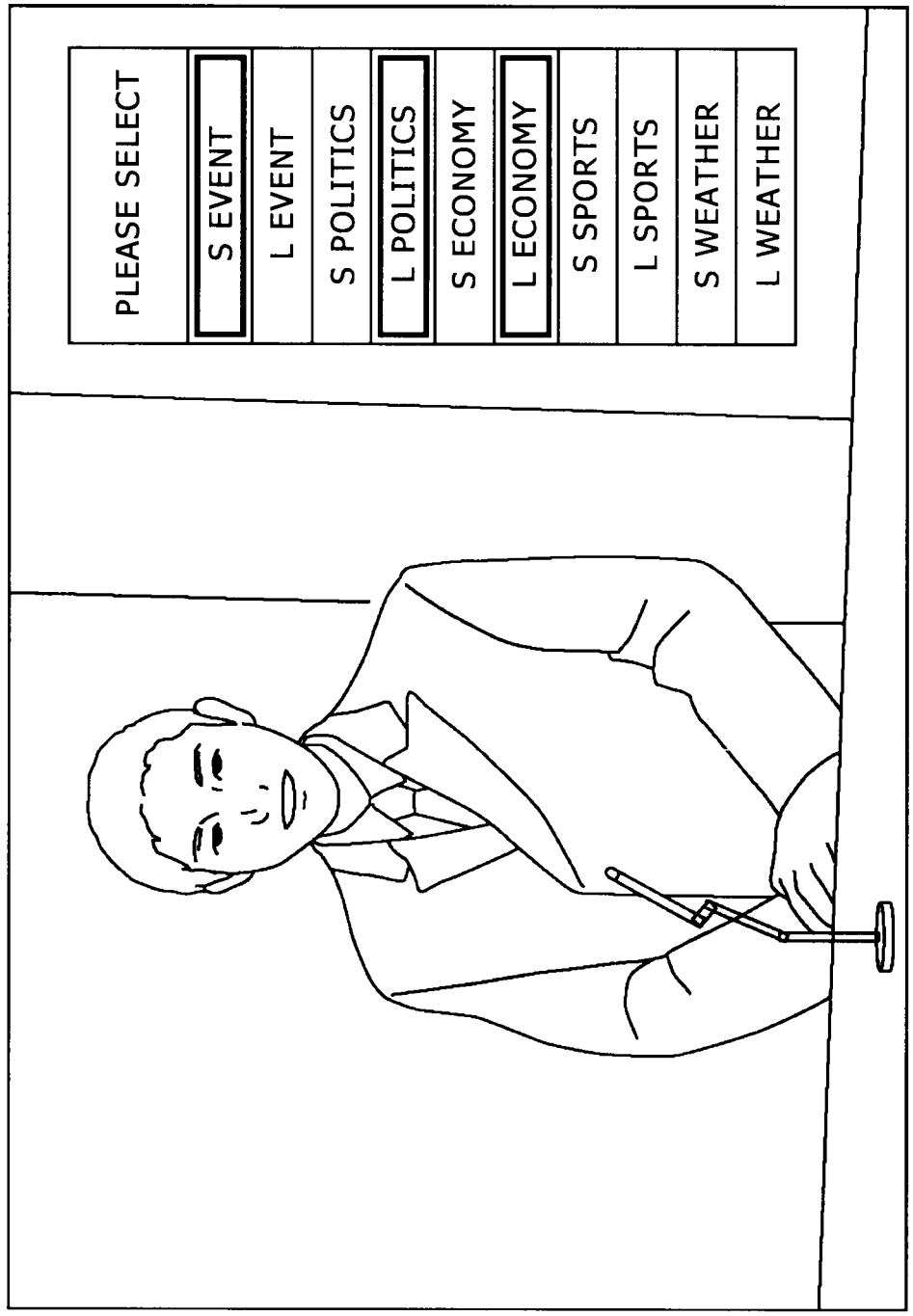
FIG. 3 is a view illustrating the second successive reproduction scenario (variable time length program)

FIGS. 2 and 3 are views illustrating a second successive reproduction scenario (variable time length program). In this scenario, at the top of a program configured from a plurality of parts as a broadcasting content, for example, like a news program, one of a short version (S) by the broadcasting content and a long version (L) by the delivery content can be selected regarding each part as indicated in an example of screen display of FIG. 3. Further, it is possible to select none of the short version and the long version. Consequently, the reproduction time of the program has a variable length. Depending upon selection by the viewer, there is the possibility that the end time of the delivery content may be become later than the end time of the broadcasting content. In this instance, there is difficulty when a next program (broadcasting content) to the pertaining broadcasting content is to be enjoyed. As a countermeasure against this, reproduction of the delivery content may be interrupted at start time of the next program (broadcasting) or the next program (broadcasting content) may be buffered. It is to be noted that, in the case where the next program (broadcasting content) to the broadcasting content is not to be enjoyed, the delivery content may be reproduced to the last.

Figure 4:
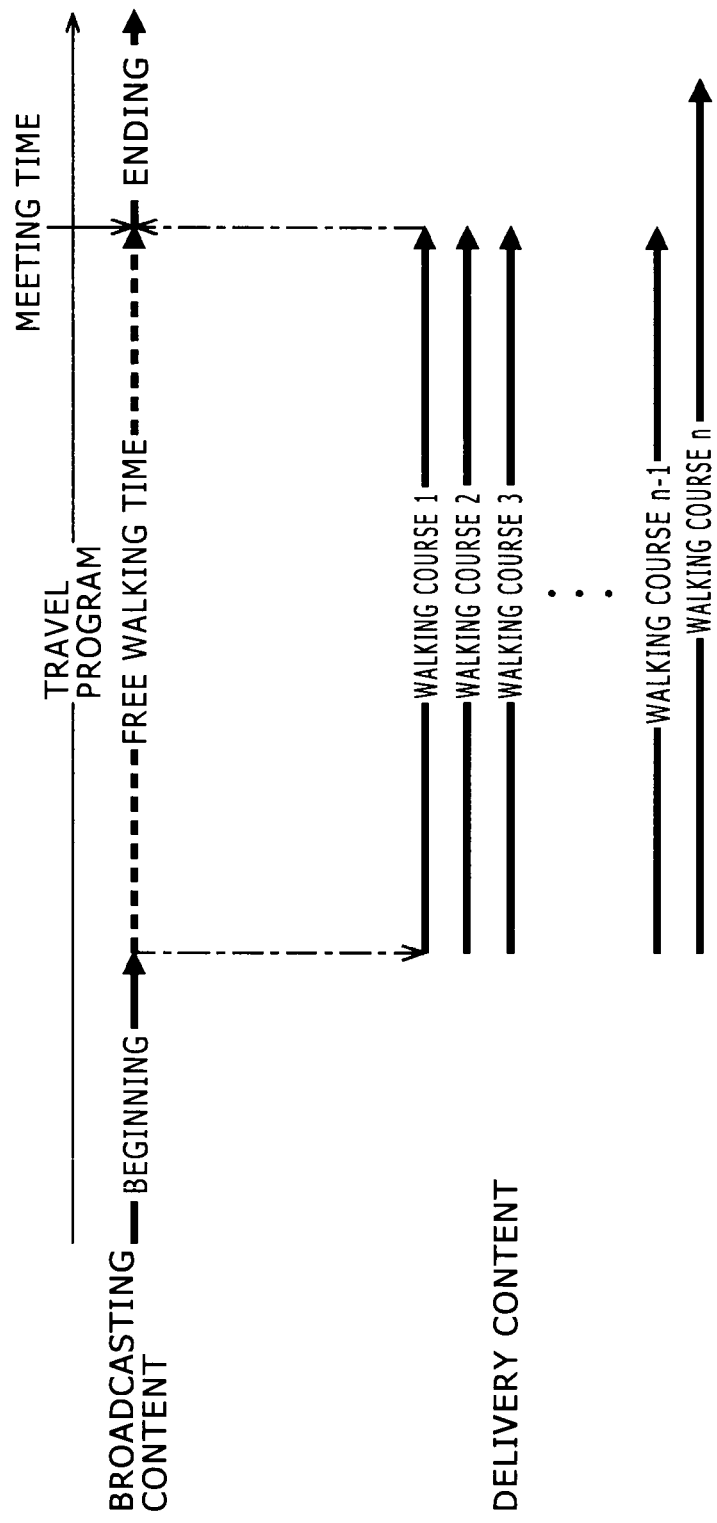
FIG. 4 is a view illustrating a third successive reproduction scenario (interactive program)
Figure 5:
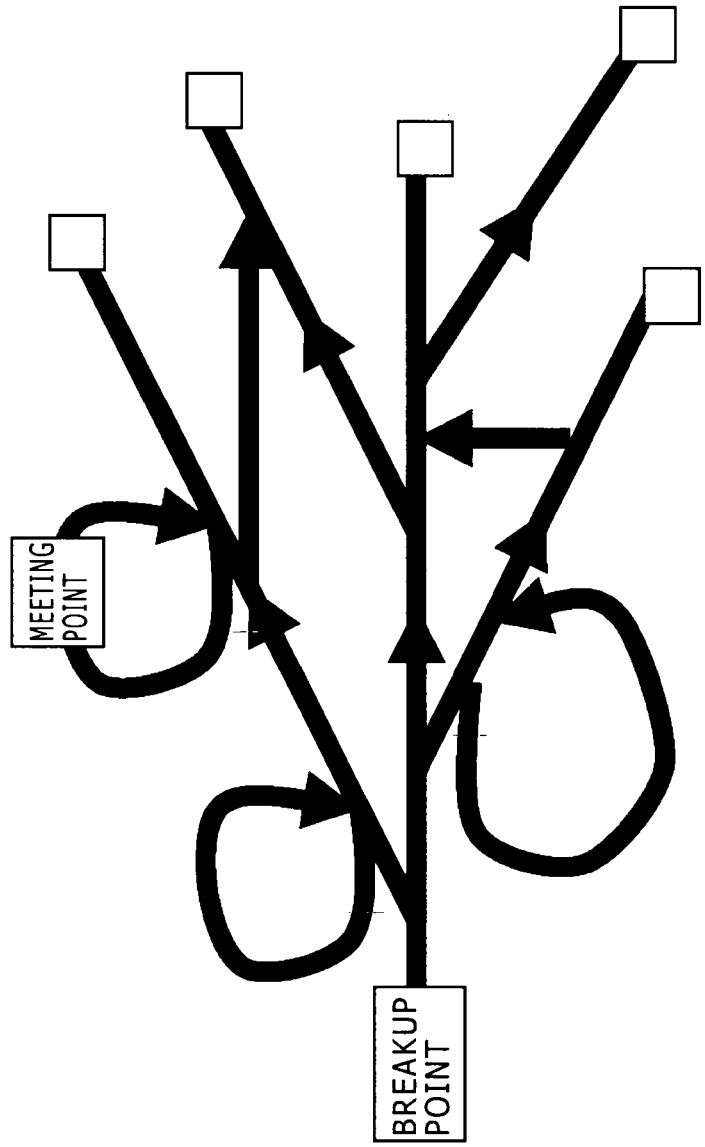
FIG. 5 is a view illustrating the third successive reproduction scenario (interactive program)

FIGS. 4 and 5 are views illustrating a third successive reproduction scenario (interactive program). In this scenario, it is made possible to introduce, at the top of a travel program as a broadcasting content, for example, such a maze-like old town famous as a landmark as shown in FIG. 5 up to an entrance of the same, provide free walking time setting the entrance as a breakup point, prepare a video image of walking through a maze-like road or the inside of a building as shown in FIG. 5, and change over the video image to individual branched video image by selection by the viewer at a branching point of a road or a shop, and then it is made possible for the reception side to carry out reception and reproduce delivered contents, which correspond to innumerable various walking courses, while successively changing over the delivered contents along a free route to be followed by the viewer. Therefore, not only a course along which various streets, various markets or the like are passed merely by selection of the viewer but also another course along which the viewer enters a shop are assumed. Further, by registering user information regarding the viewer in advance, it is made possible for the user to carry out shopping in the shop after user authentication. Further, only in the case where a meeting point is set in various routes and the viewer can meet at the meeting point within predetermined time, returning (video image changeover) to the broadcasting content may be implemented.

Figure 6:
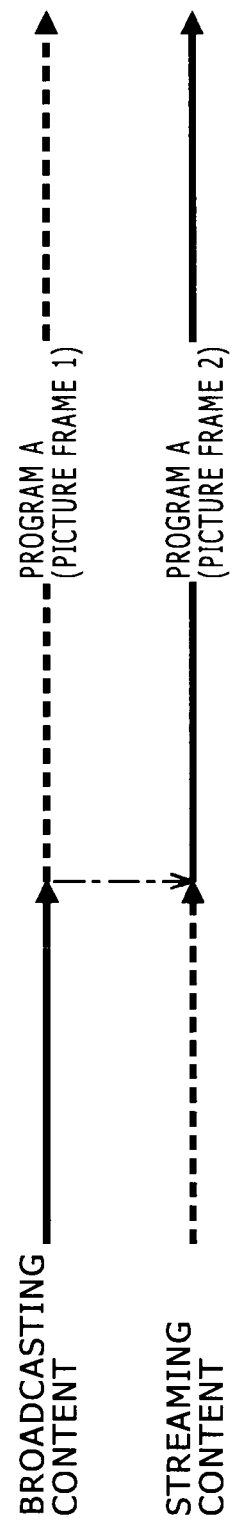
FIG. 6 is a view illustrating a fourth successive reproduction scenario (arbitrary picture frame designation program)
Figure 7:
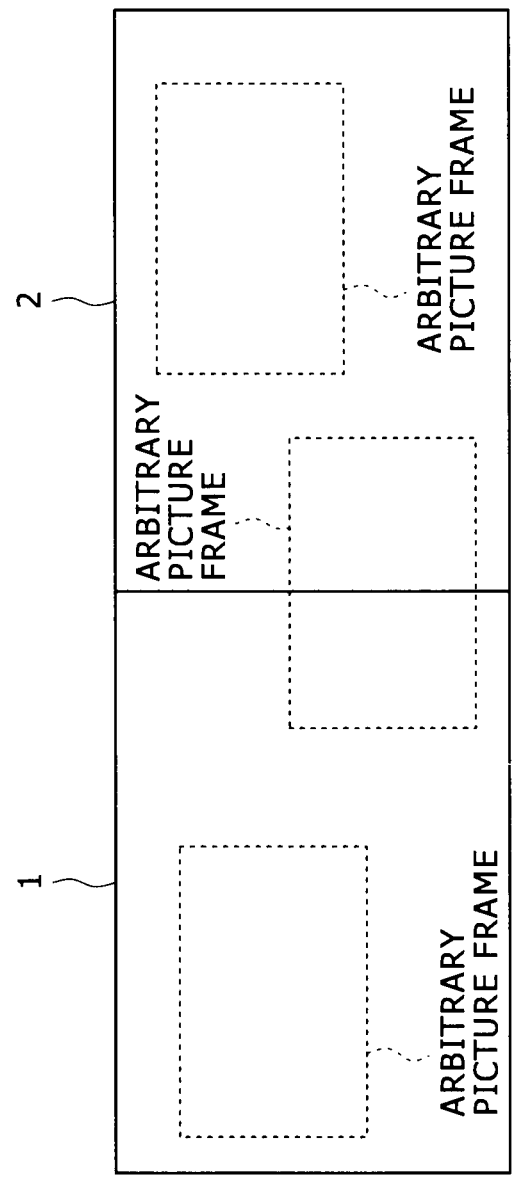
FIG. 7 is a view illustrating the fourth successive reproduction scenario (arbitrary picture frame designation program)

FIGS. 6 and 7 illustrate a fourth successive reproduction scenario (arbitrary picture frame designation program). In this scenario, in a sports program as a broadcasting content such as soccer relay broadcasting, image pickup is carried out with several high-definition (4K or more) video cameras disposed at positions at which the entire field in which the soccer is played can be overlooked, and a plurality of video images obtained as a result of the image pickup are supplied as a broadcasting content or a streaming content to the reception side. On the reception side, a picture frame (hereinafter referred to as arbitrary picture frame) of an arbitrary size would be set to an arbitrary position by the viewer and a designated arbitrary picture frame is cut out and displayed from the received broadcasting content or streaming content.

It is to be noted that, as shown in FIG. 7, in the case where the arbitrary picture frame extends over a picture frame 1 of the broadcasting content and a picture frame 2 of the streaming content, the arbitrary picture frame may be extracted after both of the broadcasting content and the streaming content are received and reproduced at the same time and video image signals obtained by the reproduction are connected to each other.

Further, a notification of the arbitrary picture frame designated by the viewer may be issued to the transmission side such that a video image corresponding to the arbitrary picture frame is cut out on the transmission side and then the cut out video image is delivered by streaming delivery.

Figure 8:
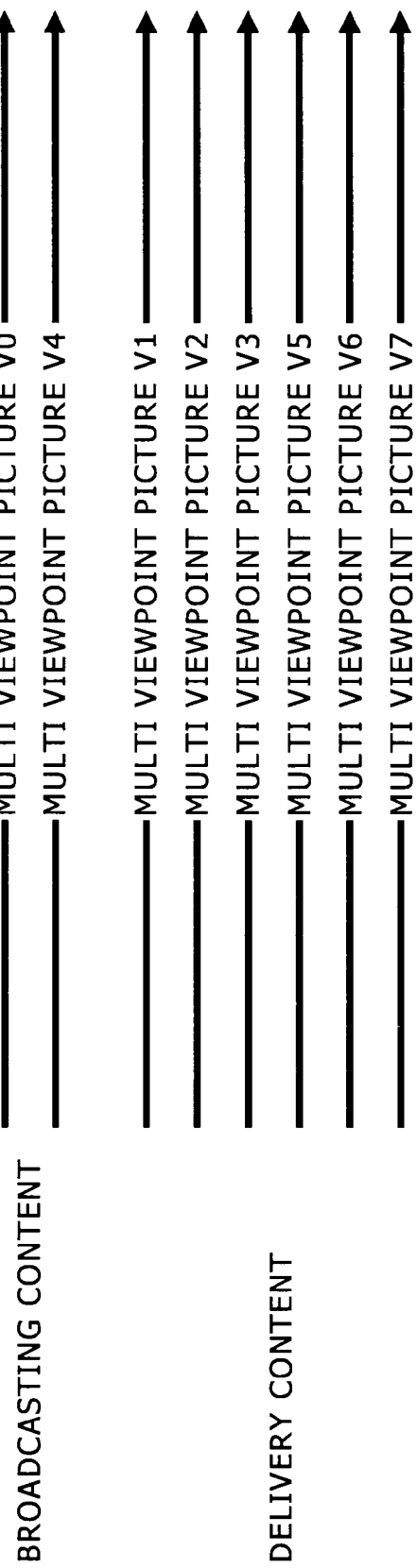
FIG. 8 is a view illustrating a fifth successive reproduction scenario (panorama type multi viewpoint program)
Figure 9:
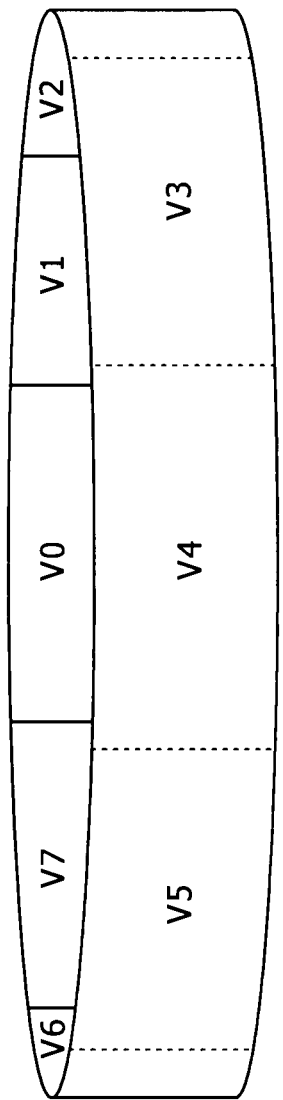
FIG. 9 is a view illustrating the fifth successive reproduction scenario (panorama type multi viewpoint program)
Figure 10:
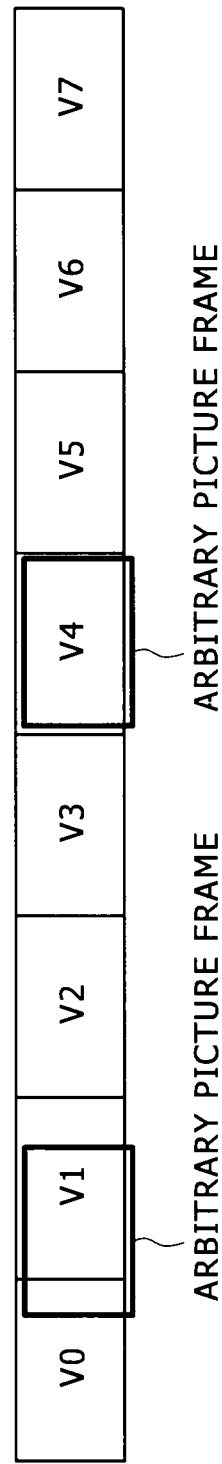
FIG. 10 is a view illustrating the fifth successive reproduction scenario (panorama type multi viewpoint program)

FIGS. 8 to 10 illustrate a fifth successive reproduction scenario (panorama type multi viewpoint program). In this scenario, as shown in FIG. 9, image pickup is carried out simultaneously over the full circumference of 360° centered at a camera, and from among a plurality of viewpoint video images V0 to V7 obtained by the image pickup, the viewpoint video image V0 and so forth which are to be an entry are determined as a broadcasting content while the other viewpoints are determined as a streaming content. It is to be noted that image pickup may not necessarily be carried out over the full circumference of 360° but may be carried out over part of the full circumference.

On the reception side, the viewer would set a picture frame (hereinafter referred to as arbitrary picture frame) in an arbitrary direction and cuts out and displays the designated arbitrary picture frame from the received broadcasting content or streaming content. It is to be noted that, in the case where the arbitrary picture frame extends over the picture frame 1 of the broadcasting content and the picture frame 2 of the streaming content as shown in FIG. 10, a picture frame may be extracted after they are received and reproduced simultaneously and video signals obtained by the reproduction are connected to each other.

Figure 11:
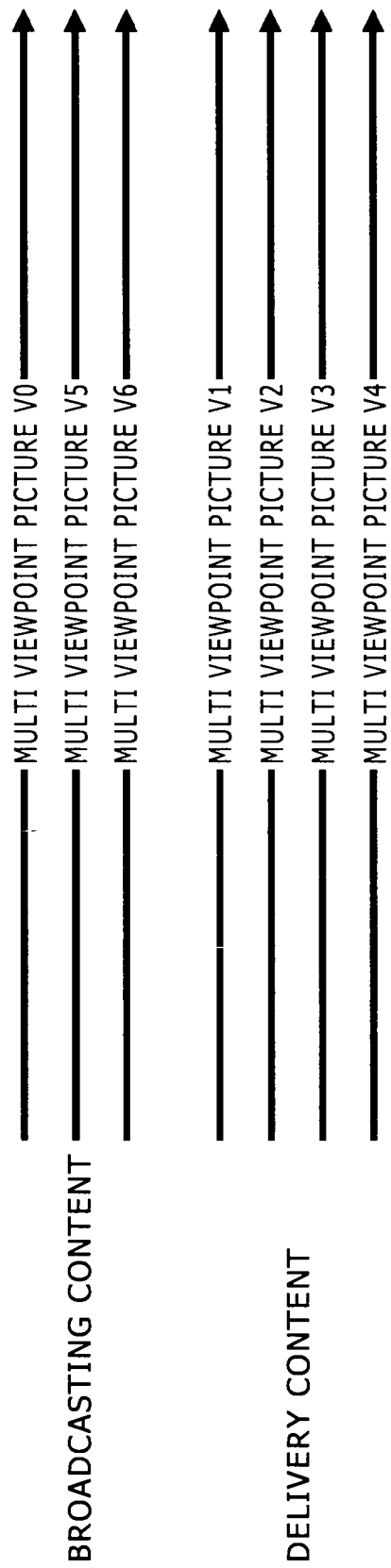
FIG. 11 is a view illustrating a sixth successive reproduction scenario (theater type multi viewpoint program)
Figure 12:
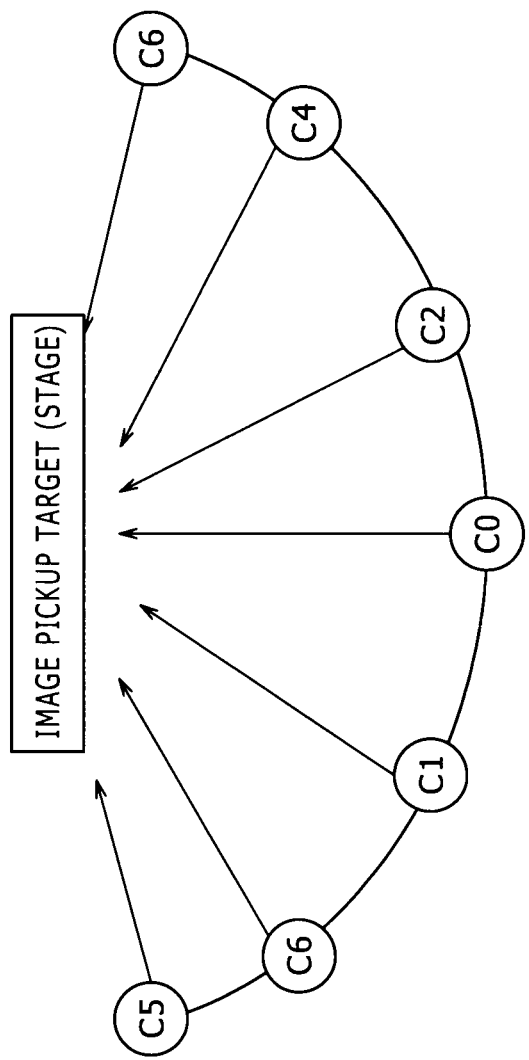
FIG. 12 is a view illustrating the sixth successive reproduction scenario (theater type multi viewpoint program)

FIGS. 11 and 12 illustrate a sixth successive reproduction scenario (theater type multi viewpoint program). In this scenario, a plurality of video cameras C0 to C6 are disposed on a concentric circle centered at a stage which becomes an object of image pickup or the like as shown in FIG. 12 and carry out image pickup simultaneously, and from among a plurality of viewpoint video images V0 to V6 obtained by the image pickup, the viewpoint video image V0 and so forth which are to be an entry are determined as a broadcasting content while the other video images are determined as a streaming content.

On the reception side, the viewer would designate an arbitrary viewpoint (camera position) such that a viewpoint video image corresponding to the designated arbitrary viewpoint is received from the broadcasting content or streaming content and reproduced and displayed. It is to be noted that, in the case where the designated viewpoint is different from the actual camera position, a video image corresponding to the designated viewpoint may be produced by an interpolation process using received and reproduced viewpoint video images individually corresponding to two actual camera positions across the designated viewpoint.

Example of the Configuration of the Content Viewing System

Now, an example of a configuration of a content viewing system of an embodiment of the present disclosure which implements the first to sixth successive reproduction scenarios described above is described.

FIG. 13 shows an example of a configuration of the content viewing system.

This content viewing system 10 is configured from a content transmission apparatus 20, and content reproduction apparatus 30-1 to 30-*n*. In the following description, in the case where there is no necessity to individually distinguish the content reproduction apparatus 30-1 to 30-*n* from each other, each of them is referred merely as content reproduction apparatus 30.

It is to be noted that the content reproduction apparatus 30 may exist as a single apparatus or may be built in a television receiver, a video recorder or the like.

The content transmission apparatus 20 includes a content storage 21, a command production section 22, a VRT production section 23, a broadcasting section 24, and a delivery section 25.

In the content storage 21, video contents to be broadcasted or delivered are retained. It is to be noted that a video content is formed from a video image stream and an audio stream.

The command production section 22 produces a video switch command for causing a process regarding video image changeover to be executed by the content reproduction apparatus 30 and outputs the video switch command to the broadcasting section 24 or the delivery section 25. The produced video switch command is embedded into and broadcasted together with a video image stream or an audio stream of a broadcasting content or embedded into and delivered together with a video image stream or an audio stream of a streaming content.

The VRT production section 23 produces a VRT (View Relating Table) which is referred to when a video image is to be changed over by the content reproduction apparatus 30 and outputs the VRT to the broadcasting section 24 or the delivery section 25.

The VRT includes information of a viewpoint string type of a plurality of multi viewpoint video images which configure the video content, an acquisition destination URL (URL of a Broadcast Stream or an Internet Stream) and so forth. It is to be noted that details of the VRT are hereinafter described with reference to FIG. 21.

The broadcasting section 24 reads out, from among video contents retained in the content storage 21, a video content which is to be broadcasted as a broadcasting content, and broadcasts the read out video content as a program of television broadcasting through a broadcasting network 11. Further, the broadcasting section 24 embeds and broadcasts the produced video switch command into and together with a video image stream or an audio stream of the broadcasting content.

Further, the broadcasting section 24 places the produced VRT into a predetermined position of a broadcasting signal and broadcasts the broadcasting signal. Still further, the broadcasting section 24 may read out, from among the video contents retained in the content storage 21, a video content to be broadcasted as an accumulated content and broadcast the read out content through the broadcasting network 11.

The delivery section 25 reads out, from among the video contents retained in the content storage 21, a video content to be distributed as a streaming content or an accumulated content and distributes the read out content to the content reproduction apparatus 30 through the Internet 12. Further, the delivery section 25 supplies, in response to a request from the content reproduction apparatus 30, the produced VRT to the content reproduction apparatus 30 of the source of the supplying request through the Internet 12.

Then, FIG. 14 shows an example of a configuration of the content reproduction apparatus 30. This content reproduction apparatus 30 includes an operation inputting section 31, a control section 32, a tuner 33, a primary separation section 34, a retention buffer 35, a secondary separation section 36, a decoder 37, and a switch 38. The content reproduction apparatus 30 further includes a communication I/F 39, a streaming reception section 40, a content accumulation section 42, a flute processing section 41, a switch 43, a decoder 44, and a command analysis section 45.

The operation inputting section 31 is formed, for example, from a remote controller, a reception section for the remote controller (both not shown) and so forth, and accepts an operation of the user and notifies the control section 32 of the operation.

The control section 32 controls the components of the content reproduction apparatus 30 based on the user operation inputted thereto from the operation inputting section 31 and an analysis result of the video switch command inputted from the command analysis section 45 and received thereby. It is to be noted that illustration of control lines interconnecting the control section 32 and the components is suitably omitted.

The tuner 33 receives a television broadcasting signal broadcasted through the broadcasting network 11 and outputs the received television broadcasting signal to the primary separation section 34. The primary separation section 34 separates a broadcasting content TS (transport stream) corresponding to a channel selected by the control section 32 and outputs the broadcasting content TS to the retention buffer 35. The retention buffer 35 carries out, in a loopback mode in which the receiving signal is changed over from a broadcasting signal to a streaming signal or the like, writing of the TS of the broadcasting content but does not carry out readout outputting to the secondary separation section 36, but carries out, in any other mode, writing and reading out of the TS from the preceding stage at the same time and outputs the TS to the secondary separation section 36, under the control of the control section 32.

The secondary separation section 36 separates the broadcasting content TS inputted thereto into a video image stream and an audio stream and outputs them to the decoder 37. Further, the secondary separation section 36 outputs the TS including an accumulated content to the flute processing section 41.

The decoder 37 decodes the video image stream and the audio steam inputted thereto and outputs a video signal and an audio signal obtained as a result of the decoding to the switch 38. Further, the decoder 37 extracts a video switch command embedded in the video image stream or the audio stream inputted thereto and outputs the video switch command to the command analysis section 45.

The switch 38 outputs an input (a video signal and an audio signal) from the decoder 37 or an input from the decoder 44 to a monitor (not shown) on the succeeding stage. Further, the switch 38 connects and cuts out an input (a video signal and an audio signal) from the decoder 37 and an input from the decoder 44 or interpolates the inputs to produce a video signal and an audio signal corresponding to an arbitrary picture frame or arbitrary viewpoint and outputs the produced video signal and audio signal to the succeeding stage.

The communication I/F 39 is connected to the content transmission apparatus 20 through the Internet 12. The streaming reception section 40 acquires a streaming content from the content transmission apparatus 20 through the communication I/F 39 and the Internet 12 and outputs the acquired streaming content to the switch 43.

The flute processing section 41 extracts an accumulated content from a TS outputted from the secondary separation section 36 and outputs the extracted accumulated content to the content accumulation section 42. The content accumulation section 42 retains the broadcasted accumulated content inputted from the flute processing section 41. Further, the content accumulation section 42 acquires the accumulated content from the content transmission apparatus 20 through the communication I/F 39 and the Internet 12 and retains the acquired accumulated content. Furthermore, the content accumulation section 42 outputs the retained accumulated content to the switch 43 under the control of the control section 32.

The switch 43 outputs a streaming content from the streaming reception section 40 or an accumulated content inputted from the content accumulation section 42 to the decoder 44 under the control of the control section 32.

The decoder 44 decodes a streaming content or an accumulated content inputted thereto from the switch 43 and outputs a video signal and an audio signal obtained by the decoding to the switch 38. Further, the decoder 44 extracts a video switch command embedded in the video image stream or the audio stream inputted thereto and outputs the extracted video switch command to the command analysis section 45.

The command analysis section 45 analyzes the video switch command inputted thereto and outputs a result of the analysis to the control section 32.

[Transmission Timing of the Video Switch Command]

FIG. 15 illustrates a transmission timing of the video switch command. As shown in FIG. 15, the same video switch command is embedded successively by a plural number of times into and broadcasted together with a video image stream or an audio stream in order to suppress a reception miss by the content reproduction apparatus 30.

In the content reproduction apparatus 30, a video image is changed over in accordance with the video switch command embedded directly in the video image stream or the audio stream. Consequently, changeover of a video image can be carried out very rapidly in comparison with a case in which, for example, a predetermined application program interlocked with the video image stream is started and the video image is changed over as operation of the application program.

[Types of the Video Switch Command]

Now, five kinds of video switch commands are described. Each video switch command is classified into one of a switch command, a preload command, a preselect command, an enable switch command and a disable switch command.

FIG. 16 illustrates elements which configure a video switch command as the switch command. The switch command is a command for changing over the video image for the content reproduction apparatus 30, that is, for changing a video content to be received and decoded.

command_id is identification information of the pertaining video switch command. In the case where the same video switch command is transmitted successively by a plural number of times, this same command_id is used. Switch_id is identification information applied to each event for changing over the video image. Command code is a code number indicating that the pertaining video switch command is the switch command.

Target Media Type indicates whether a video image stream of a destination of the changeover is a broadcasting content, a delivery content of the MP4 format, a delivery content of the MPEG2_TS format, or delivery content of the AVC_TS format. Target Stream URL indicates an acquisition destination URL of the video content of the changeover destination. Stream_Start_Position indicates a reproduction starting time position of the video content of the changeover destination.

Loop Back Mode designates whether a non-loopback mode should be established or a loopback mode should be established. Here, the loopback mode indicates a case in which, after video changeover is carried out and then video reproduction of the changeover designation comes to an end, reproduction is started from a scene, at which the changeover has been carried out, of the video image of the source of the changeover. And the non-loopback mode indicates cases other than the loopback mode.

In the case where a streaming or accumulated content is the changeover source, only it is necessary to store the changeover position in the loopback mode, but in the case where a broadcasting signal is the changeover source, consideration is required. Here, the non-loopback mode in the case where a broadcasting signal is the changeover source and the loopback are described with reference to FIG. 17. A of the figure illustrates the non-loopback mode and B of the figure illustrates the loopback mode. As apparent from the figures, in the case of the non-loopback mode, in the case where changeover of the video image is carried out, also within a period after the video image is changed over, the video image of the changeover source (in the case of A of the figure, a program A) is progressed as it is, and that, the video image of the changeover source and the video image of the changeover destination are replaced with each other.

In contrast, in the case of the loopback mode, when changeover of the video image is carried out, the video image of the changeover source (in the case of A of the figure, the program A) is written into the retention buffer 35 within the period within which the video image is changed over. However, since the video image is not read out and not outputted to the secondary separation section 36, in the case where the video image is returned to the video image of the changeover source to resume reproduction, video images accumulated in the retention buffer are reproduced beginning with the video image immediately after the changeover. Accordingly, the viewer comes to view a state in which the video image of the changeover destination is inserted in the video image of the changeover source.

Reference is returned to FIG. 16. Personalized Mode indicates whether or not there exits user authentication upon acquisition of a delivery content and indicates whether a device ID of the content reproduction apparatus 30 is to be used or inputting of a password is requested to a user upon user authentication. It is to be noted that, when user authentication is to be carried out, it is necessary to register a device ID of the content reproduction apparatus 30 or a password into the content transmission apparatus 20 in advance. The content transmission apparatus 20 supplies a delivery stream specialized for the user in response to a result of the user authentication. Auto Switch Flag indicates whether a confirmation is to be requested to the user before changeover of the video image. Switching message is a question to be presented to the user in the case where a confirmation of the user is to be acquired before changeover of the video image.

FIG. 18 illustrates elements which configure a video switch command as the preload command. The preload command is a command for controlling the content reproduction apparatus 30 to receive a video image content of the changeover destination preceding to the timing of the changeover of the video image.

command_id is identification information of the pertaining video switch command. Switch_id is identification information applied to each event in which the video image is changed over. Command code is a code number indicating that the pertaining video switch command is the preload command.

Target Media Type indicates whether the video image stream of the changeover destination is a broadcasting content, a delivery content of the MP4 format, a delivery content of the MPEG2_TS format or a delivery content of the AVC_TS format. Target Stream URL indicates an acquisition destination URL of a video content of the changeover destination. Stream_Start_Position indicates a reproduction starting time position of a video content of the changeover destination.

Loop Back Mode designates whether the non-loopback mode should be established or the loopback mode should be established.

Personalized Mode indicates presence or absence of a user authentication upon acquisition of a delivery content and whether the device ID of the content reproduction apparatus 30 should be used or a password should be used upon user authentication. Auto Switch flag indicates whether or not, upon changeover of the video image, such changeover should be confirmed by the user. Time_to_switch indicates scheduled time until the video image is switched to a video image of a video content acquired in response to the pertaining preload command.

FIG. 19 illustrates elements which configure a video switch command as the preselect command. The preselect command is a command for controlling the content reproduction apparatus 30 to cause the user to confirm presence or absence of video image changeover preceding to the timing of the changeover of the video image.

command_id is identification information of the pertaining video switch command. Switch_id is identification information which is applied to each event with which the video image is changed over. Command code is a code number indicating that the pertaining video switch command is the preselect command.

Switching message is a question to be presented to the user in the case where, before changeover of the video image, such changeover is confirmed by the user. Time_to_switch indicates scheduled time until the video image is changed over to a video image of a video content selected in response to the pertaining preselect command.

FIG. 20 illustrates elements which configure a video switch command as the enable switch command. The enable switch command is a command for controlling the content reproduction apparatus 30 to acquire a VRT so as to make viewpoint changeover possible in a panorama type multi viewpoint video program or a theater type multi viewpoint video program.

The id attribute of a neighbor_view element is identification information of a viewpoint video image (hereinafter referred to as adjacent viewpoint video image) picked up at a camera position adjacent the camera position at which the pertaining viewpoint video image corresponding to a View_object element is picked up. The type attribute is identification information . . . a viewpoint video image designated by the View_object element and the adjacent . . . .

command_id is identification information of the video switch command. Switch_id is identification information applied to each event at which the video image is changed over. Command code is a code number indicating that the pertaining video command is the enable switch command. Switching Meta URL indicates the acquisition destination URL of the VRT.

Here, the VRT is described. FIG. 21 shows an example of elements which configure the VRT.

The View_object element is information regarding each viewpoint video image which configures a panorama type multi viewpoint program or a theater type multi viewpoint program, and a number of such View point elements equal to the number of viewpoint video images are described. In the View_object element, six attributes including an id attribute, a name attribute, a format attribute, a horizontal_size attribute, a vertical_size attribute and a location attribute are provided.

The id attribute of the View_object element is identification information for the pertaining viewpoint video image. In the name attribute, a title of the multi viewpoint video image is described. The format attribute indicates an encoding format of the multi viewpoint video image. The horizontal_size attribute indicates the size of the multi viewpoint video image in the horizontal direction. The vertical_size attribute indicates the size of the multi viewpoint video image in the vertical direction. The location attribute indicates the acquisition destination URL of the viewpoint video image.

Further, in the View_object element, a neighbor_view element indicative of information regarding a multi viewpoint video image picked up at a camera position adjacent the camera position at which the pertaining multi viewpoint video image is picked up is described as a child element. In the neighbor_view element, four attributes including an id attribute, a type attribute, a direction attribute and a distance attribute are provided. In the type attribute, a viewpoint column type (panorama type or theater type) representative of a relationship to the viewpoint video image is indicated. In the direction attribute, the direction of the camera position at which an adjacent viewpoint video image is picked up with respect the camera position at which the pertaining viewpoint image is picked up corresponding to the View_object element. The distance attribute indicates a view field angle of the camera position at which the adjacent video image is picked up with respect to the camera position at which the pertaining viewpoint video image corresponding to the View_object is picked up.

FIG. 22 illustrates elements which configure a video switch command as the disable switch command. The disable switch command is a command for controlling the content reproduction apparatus 30 to invalidate the acquired VRT so that the viewpoint changeover in a panorama type multi viewpoint video image program or a theater type multi viewpoint video image program may become impossible.

command_id is identification information of the pertaining video switch command. Switch_id is identification information which is applied to each event at which the video image is changed over. Command code is a code number indicating that the pertaining video switch command is the disable switch command.

[Description of the Operation]

Now, four examples of utilization of the video switch commands described above are described. It is to be noted that the four kinds of utilization examples can be adopted suitably in the first to fifth successive reproduction scenarios described hereinabove.

Figure 23:
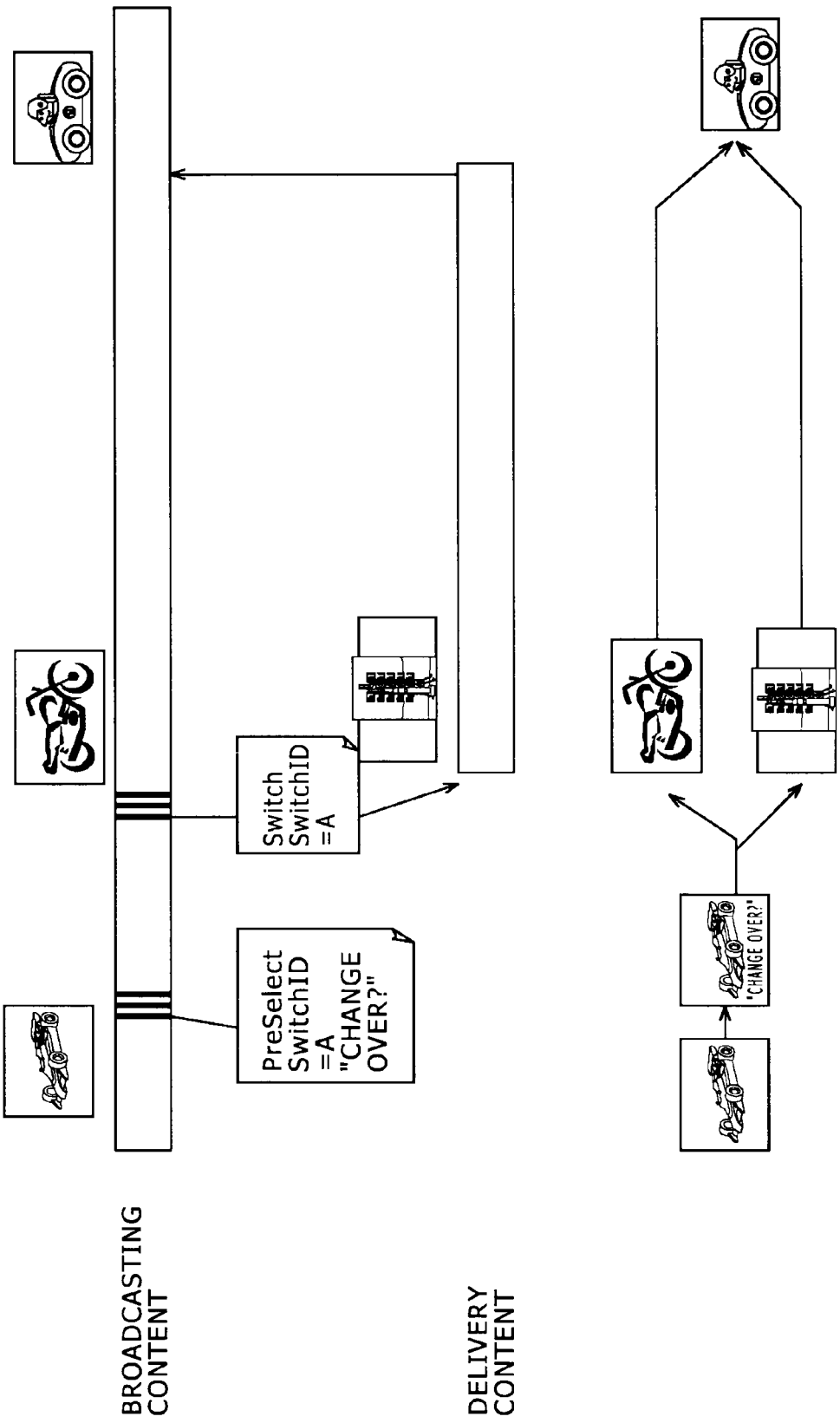
FIG. 23 is a view illustrating an example of utilization of the preselect command in an automatic switching operation.

FIG. 23 illustrates a utilization example of the preselect command in an auto switching operation.

In the case where the video image is changed over from a video image of a broadcasting content to a video image of a delivery content, the preselect command is transmitted preceding to the changeover timing, and the switch command is transmitted at the changeover timing.

On the reception side, a viewer (user of the content reproduction apparatus 30) is caused to select presence or absence of execution of video image changeover in response to the preselect command. Here, in the case where the viewer selects presence of video image changeover, an auto switch for an event of video image changeover indicated by Switch_id of the preselect command is set. On the contrary, in the case where the viewer selects that video image changeover should not be carried out, no changeover to an event of video image changeover indicated by Switch_id of the preselect command is set. Thereafter, when the switch command is received, in the case where the auto switch is set in response to the preselect command mentioned above, video image changeover is executed automatically, but if no changeover is set, video image changeover is not executed.

In the case where changeover of the video image is executed, it is decided in response to Loop Back Mode of the switch command whether or not loopback should be carried out after the video image of the changeover destination comes to an end.

However, in the case of FIG. 23, since the delivery content of the changeover destination has been acquired in response to the switch command, there is the possibility that the changeover of the video image may not be carried out seamlessly. Therefore, a method by which the video image can be changed over seamlessly is described.

Figure 24:
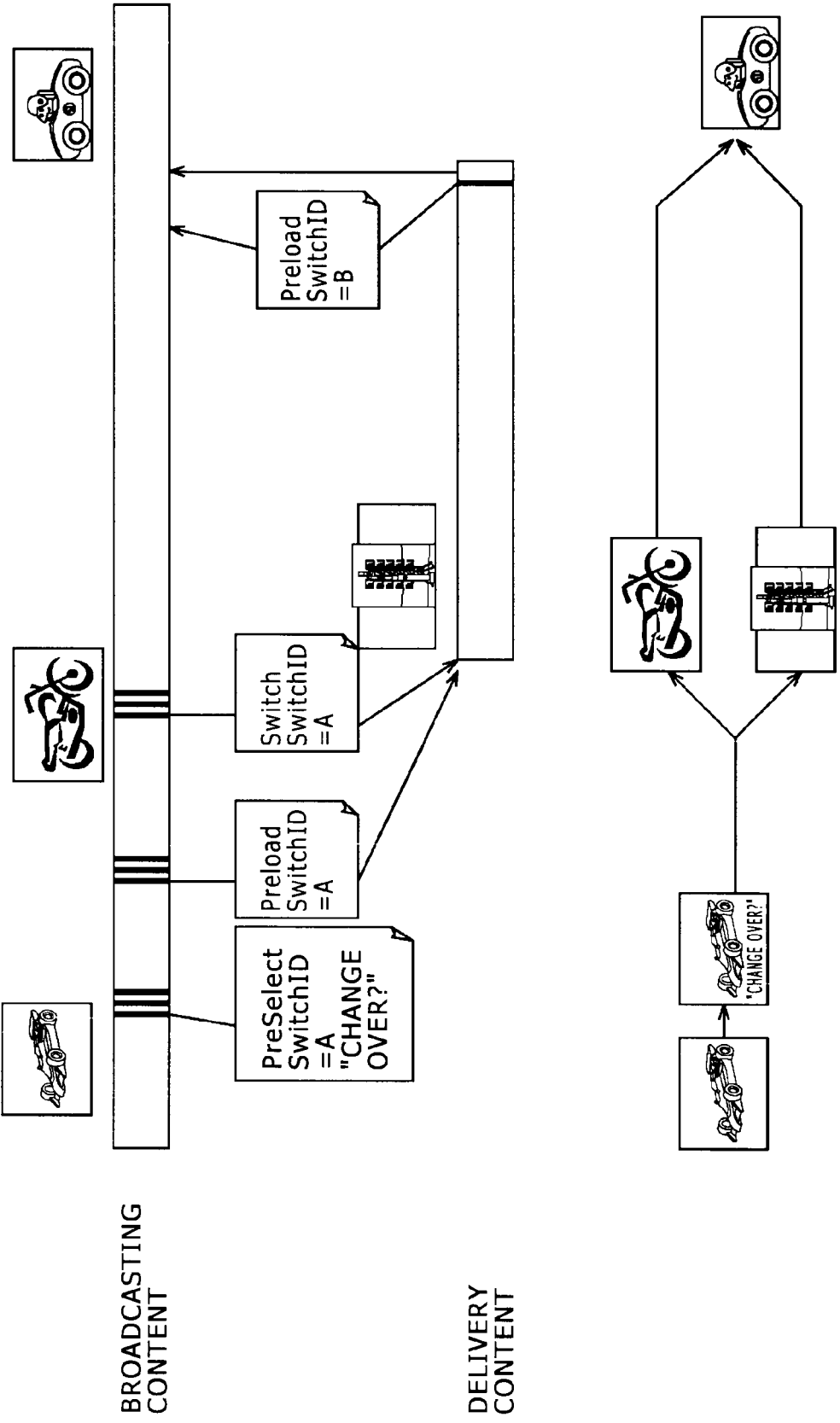
FIG. 24 is a view illustrating an example of utilization of the preselect command and the preload command in the automatic switching operation.

FIG. 24 illustrates an example of utilization of the preselect command and the preload command in an auto switching operation.

When the video image is to be changed over from a video image of a broadcasting content to a video image of a delivery content, the preselect command and the preload command are transmitted preceding to the changeover timing, and the switch command is transmitted at the changeover timing.

On the reception side, a viewer (user of the content reproduction apparatus 30) is caused to select presence or absence of execution of video image changeover in response to the preselect command. Here, in the case where the viewer selects presence of video image changeover, an auto switch for an event of video image changeover indicated by Switch_id of the preselect command is set. Then, acquisition of a delivery content of the changeover destination is started in response to the preload command. Thereafter, if the switch command is received, then in the case where if it is set to the auto switch in response to the preselect command mentioned above, then video image changeover is executed automatically.

In the case where changeover of the video image is executed, it is determined in response to Loop Back Mode of the switch command whether or not loopback is to be carried out after the video image of the changeover destination comes to an end.

In the case of FIG. 24, since a delivery content of the changeover destination is acquired in response to the preload command, the video image can be changed over seamlessly.

Figure 25:
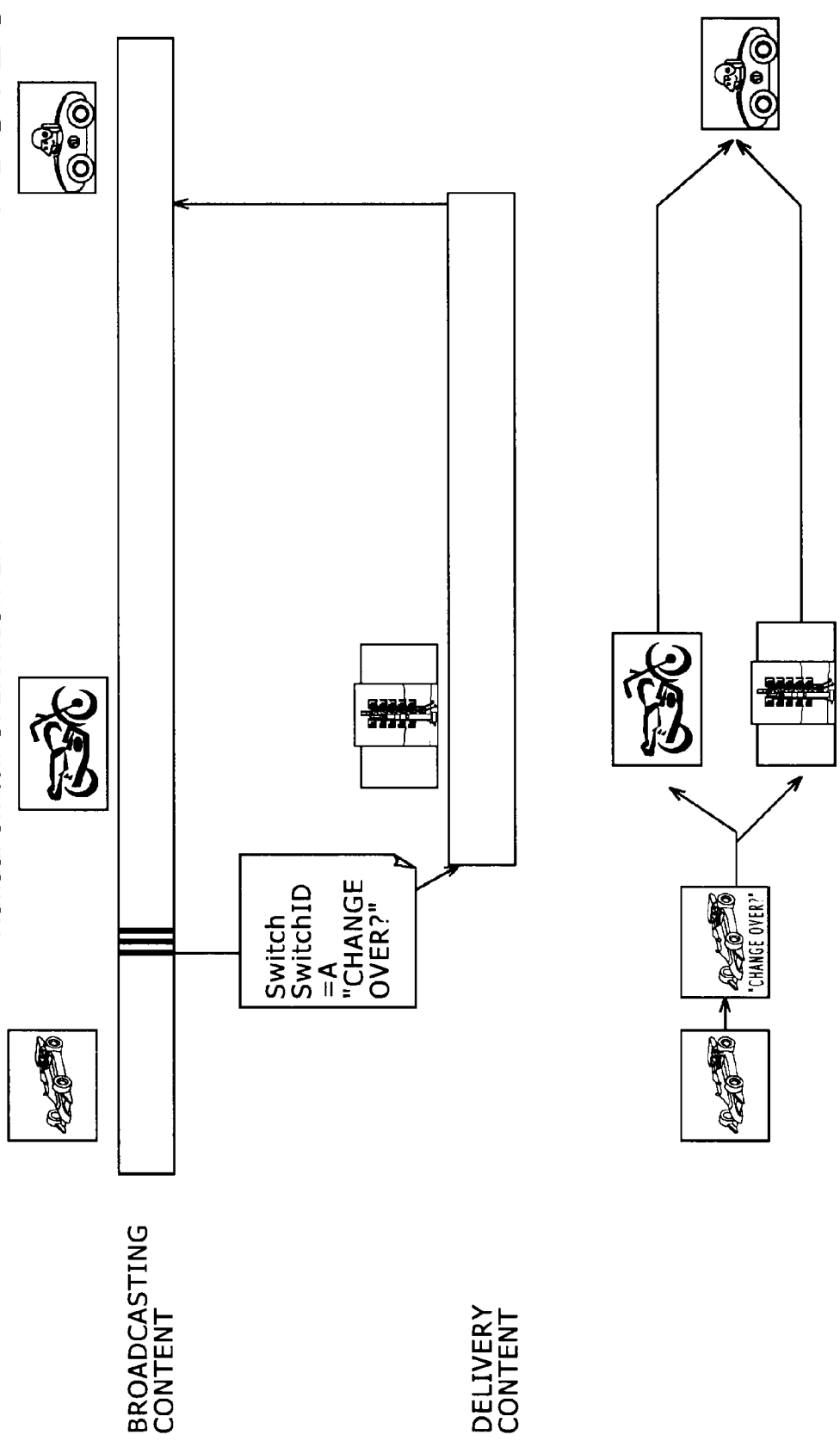
FIG. 25 is a view illustrating an example of utilization of the switch command in a manual switching operation.

FIG. 25 illustrates a utilization example of the switch command in a manual switching operation.

In the case where the video image is to be changed over from a video image of a broadcasting content to a video image of a delivery content, the switch command is transmitted at the changeover timing.

On the reception side, in the case where Auto Switch flag of the switch command is set to the manual switch, a message is displayed such that a viewer (user of the content reproduction apparatus 30) is urged to select presence or absence of execution of video image changeover. Here, in the case where the viewer selects presence of video image changeover, acquisition of a delivery content of the changeover destination is started to carry out video image changeover. It is to be noted that, in the case where Loop Back Mode of the switch command is set to the loopback mode, also while a selection operation input from the user is waited, the broadcasting content of the source of the changeover is buffered and the display is controlled to a pause state. In the case where Loop Back Mode of the switch command is set to the non-loopback mode, while a selection operation input from the user is waited, the broadcasting content of the source of the changeover source passes through the content reproduction apparatus 30 and the display of the video image of the broadcasting content is continued.

Figure 26:
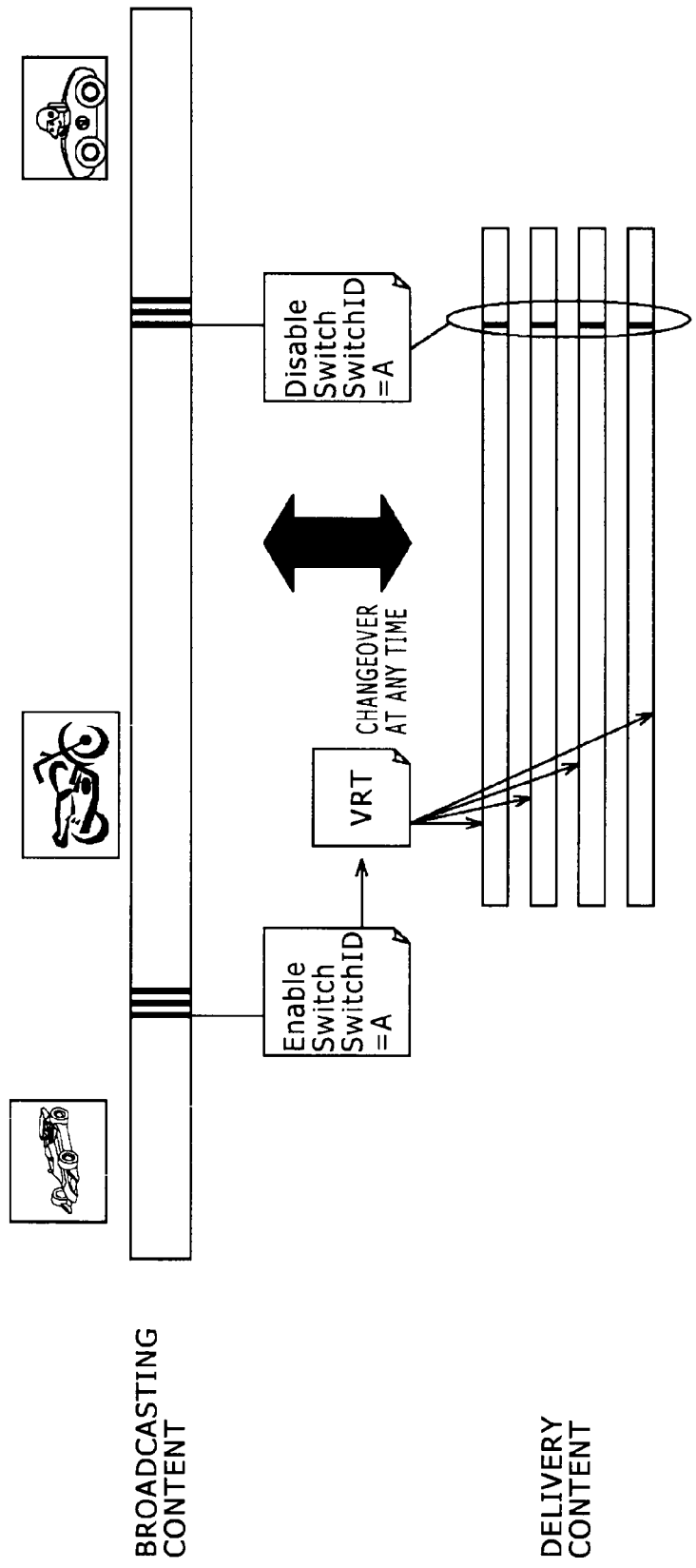
FIG. 26 is a view illustrating an example of utilization of the switch command in a manual switching operation.

FIG. 26 illustrates a utilization example of the enable switch command and the disable switch command in a viewpoint changeover operation.

When a panorama type multi viewpoint program or a theater type multi viewpoint program is to be implemented, the enable switch command is transmitted so that a VRT is acquired by the reception side. Since the reception side acquires the VRT, the viewer is notified that a viewpoint can be designated. If the viewer designates a viewpoint arbitrarily, then a multi viewpoint video image corresponding to the designated viewpoint is received and reproduced. When the arbitrary designation of a viewpoint is to be ended, the disable switch command is transmitted. On the reception side, the acquired VRT is invalidated in response to the disable switch command.

[Reproduction Process by the Content Reproduction Apparatus 30]

Figure 27:
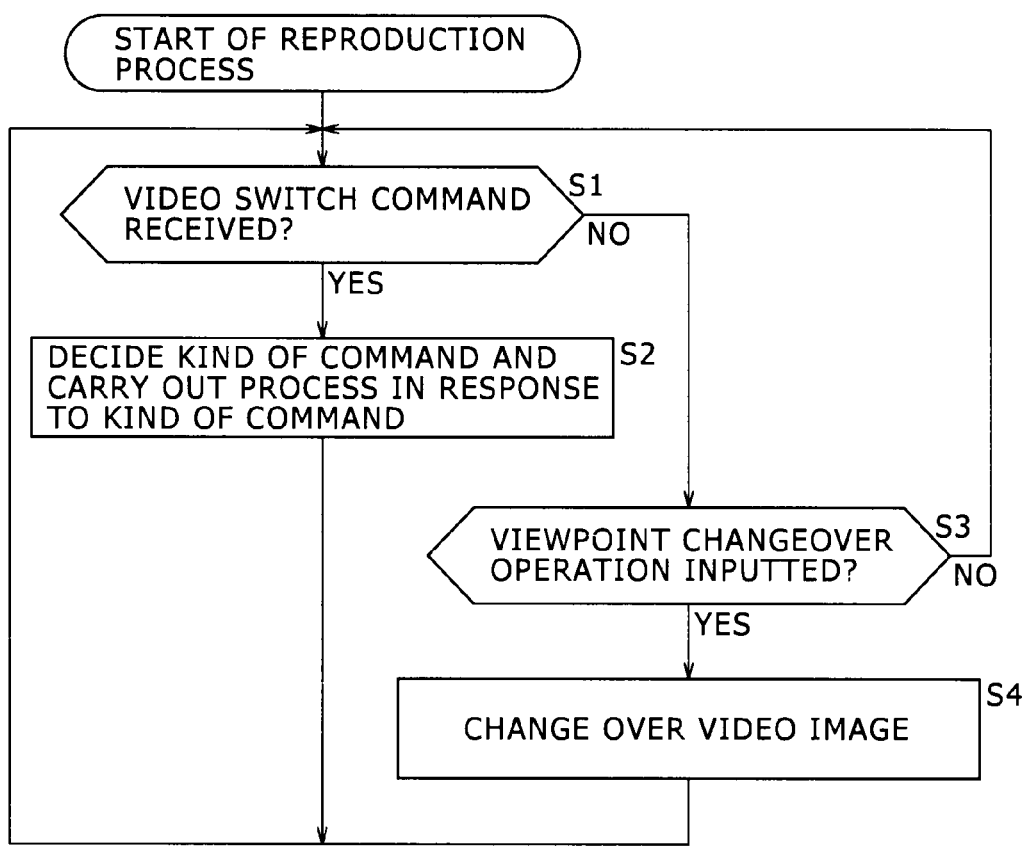
FIG. 27 is a flow chart illustrating a reproduction process by the content reproduction apparatus.

FIG. 27 is a flow chart illustrating a reproduction process by the content reproduction apparatus 30.

As a requisite, it is assumed that the content reproduction apparatus 30 has already received a broadcasting content as a program broadcasted through the broadcasting network 11.

At step S1, the command analysis section 45 decides based on presence or absence of an input from the decoder 37 whether or not a video switch command is received. If it is decided that a video switch command is received, then the processing is advanced to step S2. At step S2, the command analysis section 45 analyzes the video switch command inputted from the decoder 37 and carries out a process in accordance with a type of a command indicated by Command_code.

It is to be noted that, if it is decided at step S1 that a video switch command is not received, then the processing is advanced to step S3. At step S3, the control section 32 decides whether or not a viewpoint changeover operation is inputted from the user. If a negative decision is made, then the processing is returned to step S1. It is to be noted that inputting of a viewpoint changeover operation from the user is permitted only when viewpoint changeover is enabled by an enable switch association process. In the case where it is decided at step S3 that a viewpoint changeover operation from the user is inputted, the processing is advanced to step S4. At step S4, the control section 32 controls the associated components to receive and reproduce a delivery content corresponding to the designated viewpoint to change over the video image.

Figure 28:
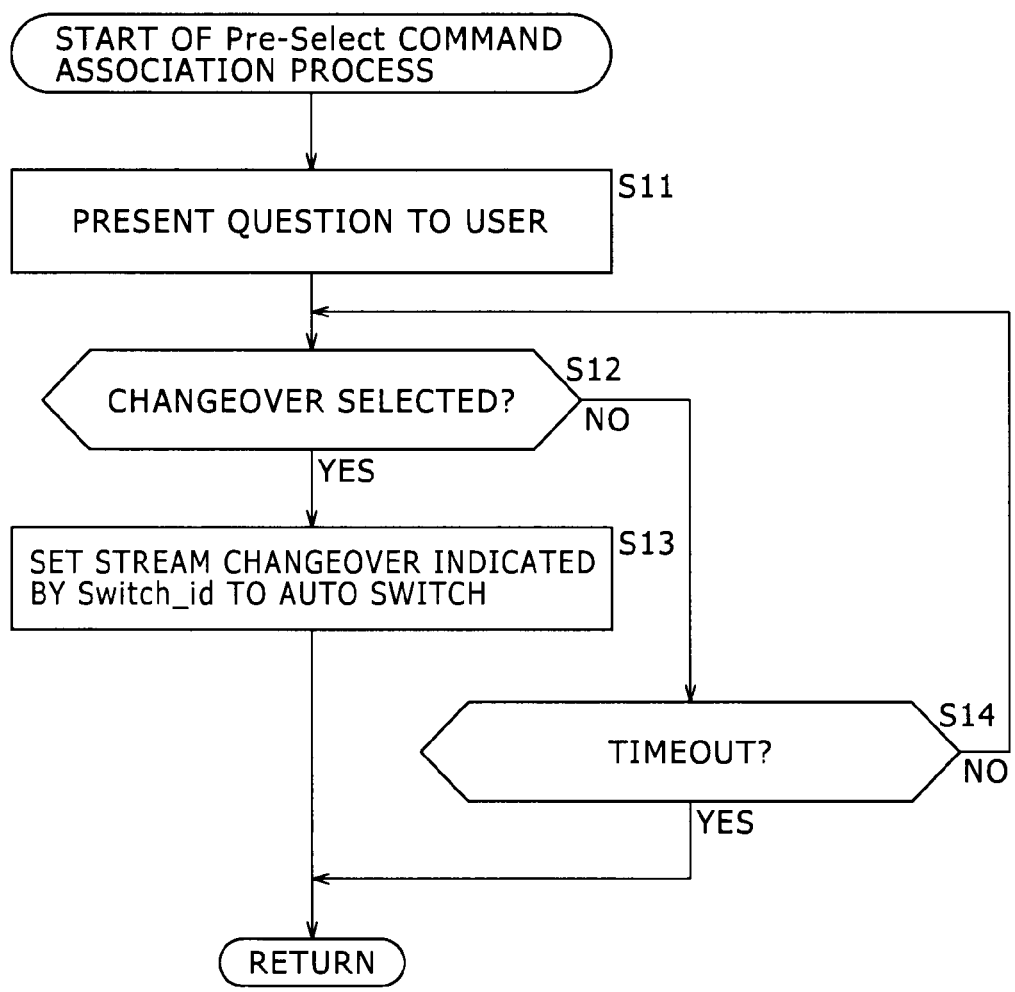
FIG. 28 is a flow chart illustrating a preselect command association process.

FIG. 28 is a flow chart illustrating a process (preselect command association process) in the case where the received video switch command is the preselect command.

At step S11, the control section 32 presents a question described in Switching message of the preselect command to the user and urges the user to select whether or not the video image should be changed over, and decides at step S12 whether or not it is selected that the video image should be changed over. In the case where it is selected that the video image should be changed over, the processing is advanced to step S13. At step S13, the control section 32 sets the video image changeover indicated by Switch_id to the auto switch.

It is to be noted that, in the case where it is not selected at step S12 that the video image should be changed over or the selection time elapses (determined based on Time_to Switch) at step S14, the preselect command association process is ended.

Figure 29:
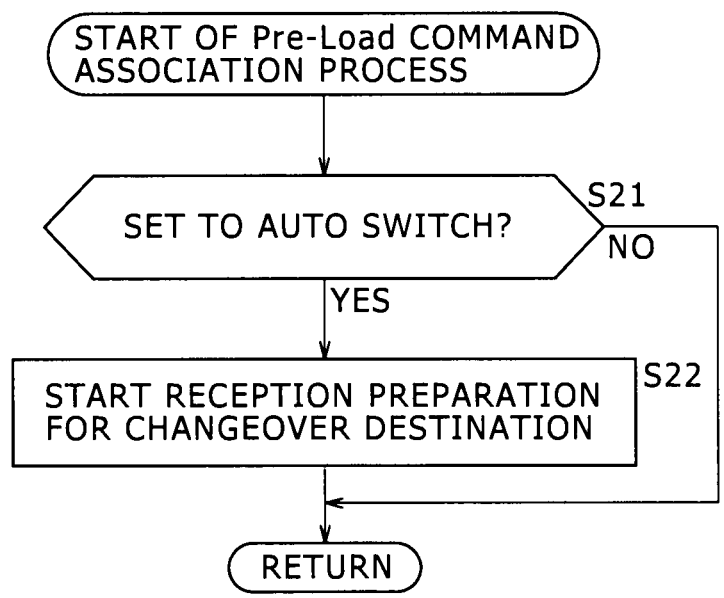
FIG. 29 is a flow chart illustrating a preload command association process.

FIG. 29 is a flow chart illustrating a process (preload command association process) in the case where the received video switch command is the preload command.

At step S21, the control section 32 decides whether or not the video image changeover indicated by Switch_id is set to the auto switch in response to the preselect command transmitted preceding to the preload command. In the case where it is decided that the video image changeover is set to the auto switch, the processing is advanced to step S22. At step S22, the control section 32 controls the associated components to start reception preparations for a delivery content of the changeover destination.

It is to be noted that, in the case where it is decided at step S21 that the video image changeover indicated by Switch_id is not set to the auto switch, the preload command association process is ended.

Figure 30:
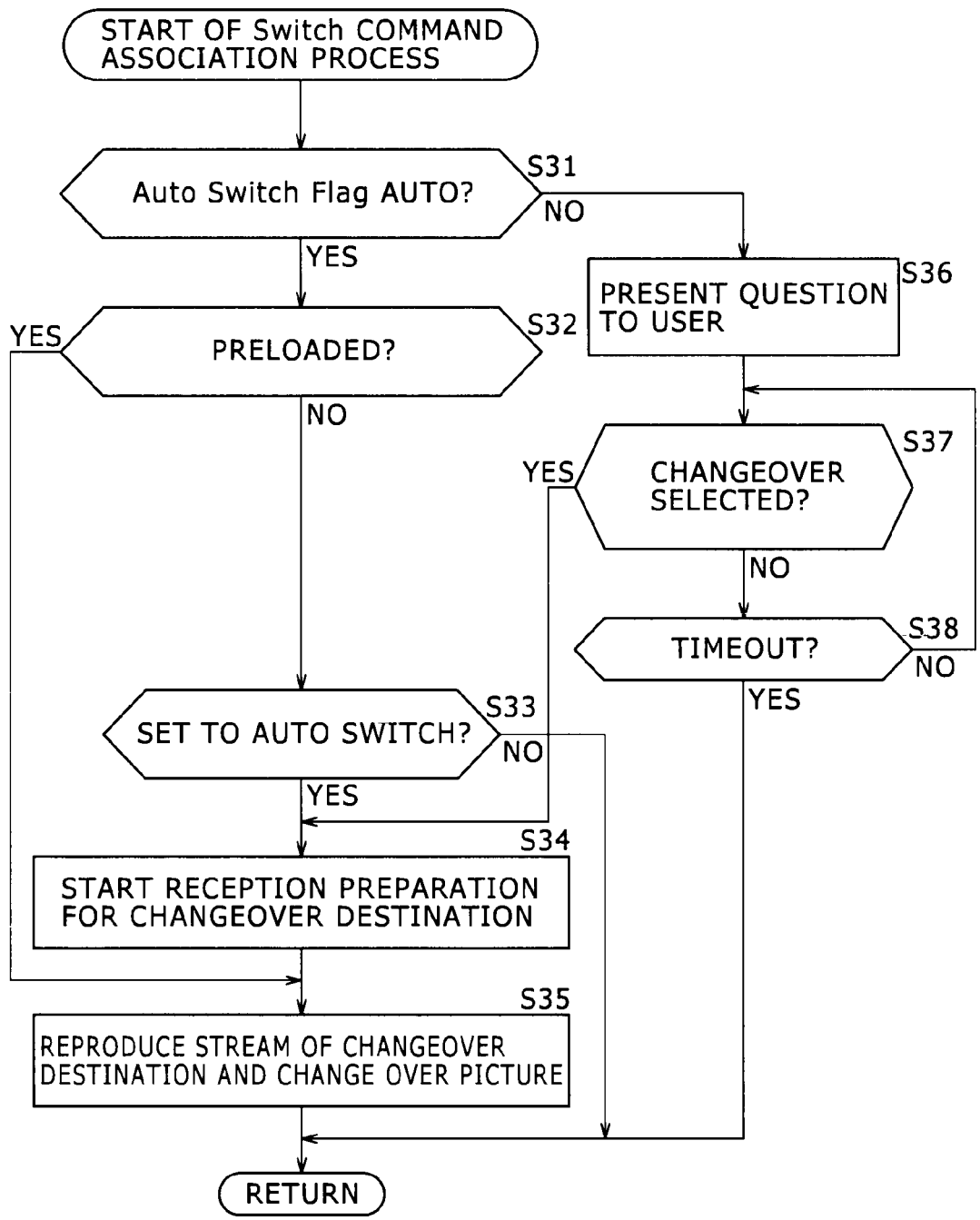
FIG. 30 is a flow chart illustrating a switch command association process.

FIG. 30 is a flow chart illustrating a process (switch command association process) in the case where the received video switch command is the switch command.

At step S31, the command analysis section 45 decides whether or not Auto Switch flag of the switch command is the auto switch or not (manual switch). In the case where it is decided that Auto Switch flag is the auto switch, the processing is advanced to step S32. At step S32, the command analysis section 45 decides whether or not the delivery content of the changeover destination is preloaded already. In the case where the delivery content is not preloaded as yet, the processing is advanced to step S33.

At step S33, it is decided whether or not the video image changeover indicated by Switch_id is set to the auto switch in response to the preselect command transmitted preceding to the pertaining switch command. In the case where it is decided that the video image changeover is set to the auto switch, the processing is advanced to step S34. At step S34, the command analysis section 45 notifies the control section 32 of a result of the analysis of the switch command till now. In response to the notification, the control section 32 controls the associated components to start reception preparations for the delivery content of the changeover destination.

At step S35, the control section 32 controls the associated components to change over the video image to that of the delivery content of the changeover destination.

It is to be noted that, in the case where it is decided at step S32 that the delivery content of the changeover destination is preloaded already, the processes at steps S33 and S34 are skipped. Further, in the case where it is decided at step S33 that the video image changeover indicated by Switch_id is not set to the auto switch in response to the preselect command transmitted preceding to the pertaining switch command, steps S34 and S45 are skipped, and the switch command association process is ended without carrying out changeover of the video image.

In the case where it is decided at step S31 that Auto Switch flag of the switch command is not the auto switch (is the manual switch), the processing is advanced to step S36. At step S36, the command analysis section 45 notifies the control section 32 of a result of the analysis of the switch command till now. In response to this notification, the control section 32 presents a question descried in Switching message of the switch command to the user and urges the user to select whether or not the video image should be changed over. At step S37, the control section 32 decides whether or not it is selected that the video image should be changed over. In the case where it is selected that the video image should be changed over, the processing is advanced to step S34 so that steps beginning with step S34 are executed.

In the case where it is not selected that the video image should be changed over, or in the case where the selection time elapses at step S38, the switch command association process is ended without carrying out changeover of the video image.

Figure 31:
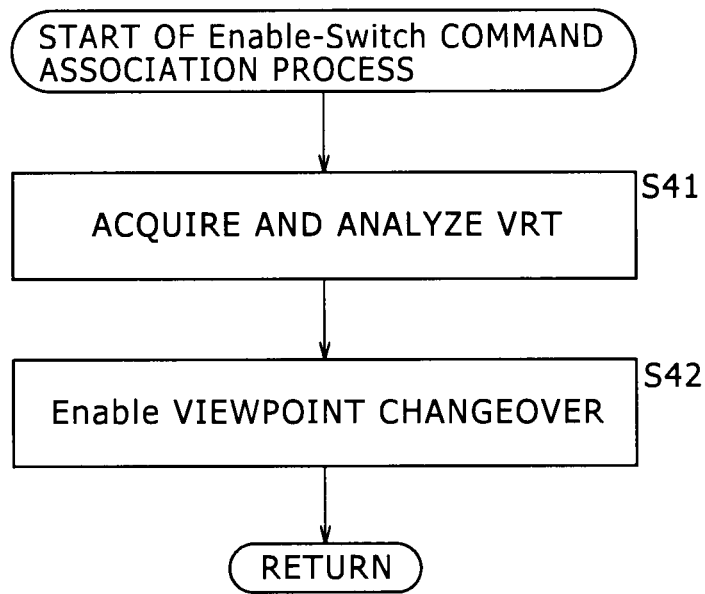
FIG. 31 is a flow chart illustrating an enable switch command association process.

FIG. 31 is a flow chart illustrating a process (enable switch command association process) in the case where the received video switch command is the enable switch command.

At step S41, the control section 32 controls the associated components based on Switching Meta URL of the enable switch command to acquire a VRT and analyzes the VRT. At step S42, the control section 32 enables viewpoint changeover and, for example, causes an arrow mark indicative of the direction of the viewpoint, which can be changed over, to be displayed on the screen thereby to present to the user that the viewpoint can be changed over. The enable switch command association process is ended therewith.

Figure 32:
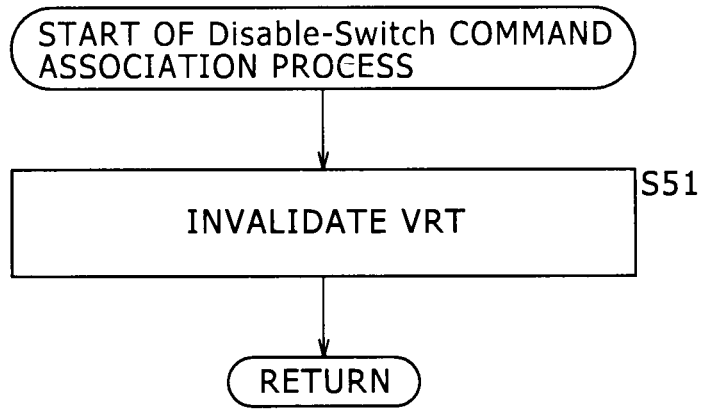
FIG. 32 is a flow chart illustrating a disable switch command association process.

FIG. 32 is a flow chart illustrating a process (disable switch command association process) in the case where the received video switch command is the disable switch command.

At step S51, the control section 32 invalidates the VRT acquired already in response to the enable switch command. Consequently, the viewpoint changeover is disabled. The disable switch command association process is ended therewith.

By the reception process described above, the first to sixth successive reproduction scenarios described hereinabove are implemented.

Incidentally, while the series of processes described above can be executed by hardware, it may otherwise be executed by software. In the case where the series of processes is executed by software, a program which constructs the software is installed from a program recording medium into a computer incorporated in hardware for exclusive use, a personal computer, for example, for universal use which can execute various functions by installing various programs, and so forth.

FIG. 33 is a block diagram showing an example of a hardware configuration of a computer which executes the series of processes described hereinabove in accordance with a program.

In this computer 100, a CPU (Central Processing Unit) 101, a RAM (Read Only Memory) 102 and a RAM (Random Access Memory) 103 are connected to each other by a bus 104.

Further, an input/output interface 105 is connected to the bus 104. An inputting section 106 including a keyboard, a mouse, a microphone and so forth, an outputting section 107 including a display unit, a speaker and so forth, a storage section 108 formed from a hard disk, a nonvolatile memory, or the like, a communication section 109 formed from a network interface or the like, and a drive 110 for driving a removable medium 111 such as a magnetic disk, an optical disk, a magneto-optical disk or a semiconductor memory are connected to the input/output interface 105.

In the computer 100 configured in such a manner as described above, the CPU 101 loads a program stored, for example, in the storage section 108 into the RAM 103 through the input/output interface 105 and the bus 104 and executes the program to carry out the series of processes described above.

It is to be noted that the program to be executed by the computer may be of the type by which the processes are carried out in a time series in the order as described in the present specification or of the type by which the processes are executed in parallel or executed individually at necessary timings such as when the process is called.

Further, the program may be of the type which is processed by a single computer or may be of the type which is carried out by distributed processing by a plurality of computers. Further, the program may be transferred to and executed by a computer at a remote place.

Further, in the present specification, the term system is used to represent an entire apparatus composed of a plurality of apparatus.

It is to be noted that the embodiment of the present disclosure is not limited to the embodiment described hereinabove but can be altered in various manners without departing from the subject matter of the present disclosure.

What is claimed is:

1. A content supplying apparatus for supplying a first video content to a content reproduction apparatus, comprising:
    a processor configured to produce a video switch command for causing the content reproduction apparatus to execute, when the first video content is being reproduced and displayed to a user of the content reproduction apparatus, a process regarding changeover of reproduction from the first video content being displayed to the user to a second video content to be displayed to the user;
    a transmitter configured to broadcast via a terrestrial broadcast the first video content, in which the produced video switch command is embedded, through a broadcasting network; and
    a communication interface configured to deliver the second video content through the Internet, wherein
    said circuitry produces the video switch command including an element for an instruction regarding whether or not loopback is to be carried out upon returning, after the second video content to be reproduced is changed back, to the first video content being reproduced before the changeover.

2. The content supplying apparatus according to claim 1, wherein said processor produces the video switch command as:
    a preselect command for urging the user to confirm whether or not execution of the changeover is permitted preceding to a changeover timing to the second video content;
    a preload command for causing the second video content of a changeover destination to be acquired preceding to the changeover timing; or
    a switch command for causing the reproduction of the first video content to be changed over to the second video content.

3. The content supplying apparatus according to claim 2, wherein said processor produces the video switch command including an element for an instruction regarding whether or not user authentication is to be carried out upon acquisition of the second video content of the changeover destination.

4. The content supplying apparatus according to claim 2, wherein said processor produces the video switch command as:
    the preselect command;
    the preload command;
    the switch command;
    an enable switch command for establishing a state in which the first video content can be changed over to the second video content corresponding to a point of view designated by the user; or
    a disable switch command for ending the state in which the first video content can be changed over to the second video content corresponding to the point of view designated by the user.

5. The content supplying apparatus according to claim 2, wherein the communication interface also delivers the first video content, in which the produced video switch command is embedded, through the Internet.

6. A content supplying method for a content supplying apparatus which supplies a first video content to a content reproduction apparatus, the content supplying method comprising:
producing, by a processor of the content supplying apparatus, a video switch command for causing the content reproduction apparatus to execute, when the first video content is being reproduced and displayed to a user of the content reproduction apparatus, a process regarding changeover of reproduction from the first video content being displayed to the user to a second video content to be displayed to the user;
broadcasting via a terrestrial broadcast the first video content, in which the produced video switch command is embedded, through a broadcasting network; and
delivering the second video content through the Internet, wherein
the produced video switch command includes an element for an instruction regarding whether or not loopback is to be carried out upon returning, after the second video content to be reproduced is changed back, to the first video content being reproduced before the changeover.

7. A non-transitory computer-readable storage medium storing a program that when executed by a computer, which supplies a first video content to a content reproduction apparatus, causes the computer to perform a method comprising:
producing, by the computer, a video switch command for causing the content reproduction apparatus to execute, when the first video content is being reproduced and displayed to a user of the content reproduction apparatus, a process regarding changeover of reproduction from the first video content being displayed to the user to a second video content to be displayed to the user;
broadcasting via a terrestrial broadcast the first video content, in which the produced video switch command is embedded, through a broadcasting network; and
delivering the second video content through the Internet, wherein
the produced video switch command includes an element for an instruction regarding whether or not loopback is to be carried out upon returning, after the second video content to be reproduced is changed back, to the first video content being reproduced before the changeover.

8. A content reproduction apparatus for reproducing a first video content supplied from a content supplying apparatus, comprising:
a receiver configured to acquire the first video content broadcasted via a terrestrial broadcast through a broadcasting network;
a communication interface configured to acquire a second video content delivered through the Internet; and
a processor configured to
analyze a video switch command embedded in the acquired first video content while the first video content is being reproduced and displayed to a user, and
control a process regarding changeover of reproduction from the first video content being displayed to the user to the second video content to be displayed to the user in accordance with a result of the analysis of the video switch command, wherein
the video switch command includes an element for an instruction regarding whether or not loopback is to be carried out upon returning, after the second video content to be reproduced is changed back, to the first video content being reproduced before the changeover.

9. The content reproduction apparatus according to claim 8, wherein the video switch command is:
a preselect command for urging the user to confirm whether or not execution of the changeover is permitted preceding to a changeover timing to the second video content;
a preload command for causing the second video content of a changeover destination to be acquired preceding to the changeover timing of the second video content to be reproduced; or
a switch command for causing the reproduction of the first video content to be changed over to the second video content.

10. The content reproduction apparatus according to claim 9, further comprising:
a buffer configured to buffer the first video content broadcasted through the broadcasting network.

11. A content reproduction method for a content reproduction apparatus, which reproduces a first video content supplied from a content supplying apparatus, the content reproduction method comprising:
acquiring the first video content broadcasted via a terrestrial broadcast through a broadcasting network;
acquiring a second video content delivered through the Internet;
analyzing a video switch command embedded in the acquired first video content while the first video content is being reproduced and displayed to a user of the content reproduction apparatus; and
controlling a process regarding changeover of reproduction from the first video content being displayed to the user to the second video content to be displayed to the user in accordance with a result of the analysis of the video switch command, wherein
the video switch command includes an element for an instruction regarding whether or not loopback is to be carried out upon returning, after the second video content to be reproduced is changed back, to the first video content being reproduced before the changeover.

12. A non-transitory computer-readable storage medium storing a program that when executed by a computer, which reproduces a first video content supplied from a content supplying apparatus, causes the computer to perform a method comprising:
acquiring the first video content broadcasted via a terrestrial broadcast through a broadcasting network;
acquiring a second video content delivered through the Internet;
analyzing a video switch command embedded in the acquired first video content while the first video content is being reproduced and displayed to a user of the content reproduction apparatus; and
controlling a process regarding changeover of reproduction from the first video content being displayed to the user to the second video content to be displayed to the user in accordance with a result of the analysis of the video switch command, wherein
the video switch command includes an element for an instruction regarding whether or not loopback is to be carried out upon returning, after the second video content to be reproduced is changed back, to the first video content being reproduced before the changeover.

13. A content viewing system which includes a content supplying apparatus and a content reproduction apparatus, wherein:

the content supplying apparatus includes
- a processor configured to produce a video switch command for causing the content reproduction apparatus to execute, when a first video content is being reproduced and displayed to a user of the content reproduction apparatus, a process regarding changeover of reproduction from the first video content being displayed to the user to a second video content to be displayed to the user,
- a transmitter configured to broadcast via a terrestrial broadcast the first video content, in which the produced video switch command is embedded, through a broadcasting network, and
- a communication interface configured to deliver the second video content through the Internet; and the content reproduction apparatus includes
- a receiver configured to acquire the first video content broadcasted via the terrestrial broadcast through the broadcasting network,
- a communication interface configured to acquire the second video content delivered through the Internet, and
- a processor configured to
  - analyze the video switch command embedded in the acquired first video content while the first video content is being reproduced and displayed to the user, and
  - control the process regarding the changeover of reproduction from the first video content being displayed to the user to the second video content to be displayed to the user in accordance with a result of the analysis of the video switch command, wherein the video switch command includes an element for an instruction regarding whether or not loopback is to be carried out upon returning, after the second video content to be reproduced is changed back, to the first video content being reproduced before the changeover.

14. The content supplying apparatus according to claim 1, wherein
the transmitter is configured to broadcast a digital television broadcast signal that includes the first video content, in which the produced video switch command is embedded.

15. The content reproduction apparatus according to claim 8, wherein
the receiver is configured to acquire a digital television broadcast signal that includes the first video content, in which the produced video switch command is embedded.

16. The content supplying apparatus according to claim 1, wherein the process regarding changeover of reproduction is performed at a timing based on an identifier included in the video switch command, the identifier identifying a command type of the video switch command.

* * * * *